(12) United States Patent
Mori

(10) Patent No.: US 7,515,829 B2
(45) Date of Patent: Apr. 7, 2009

(54) WAVELENGTH DIVISION MULTIPLEXING OPTICAL TRANSMISSION SYSTEM

(75) Inventor: Shota Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 539 days.

(21) Appl. No.: 10/996,227

(22) Filed: Nov. 23, 2004

(65) Prior Publication Data
US 2006/0018658 A1    Jan. 26, 2006

(30) Foreign Application Priority Data
Jul. 20, 2004   (JP) .............................. 2004-210949

(51) Int. Cl.
*H04J 14/02* (2006.01)
(52) U.S. Cl. ........................................................ 398/94
(58) Field of Classification Search .................. 398/94, 398/43, 79
See application file for complete search history.

(56) References Cited

U.S. PATENT DOCUMENTS

| | | | |
|---|---|---|---|
| 6,038,062 A * | 3/2000 | Kosaka | 359/337 |
| 6,275,330 B1 | 8/2001 | Izumi | |
| 7,039,325 B2 * | 5/2006 | Sekiya et al. | 398/181 |
| 7,116,908 B2 * | 10/2006 | Uda et al. | 398/94 |
| 7,233,432 B2 * | 6/2007 | Islam et al. | 359/337 |
| 7,233,741 B2 * | 6/2007 | Ishizuka et al. | 398/48 |
| 2002/0126336 A1 | 9/2002 | Sekiya et al. | |

FOREIGN PATENT DOCUMENTS

| | | |
|---|---|---|
| JP | 2000-244411 | 9/2000 |
| JP | 2002-261693 | 9/2002 |

* cited by examiner

*Primary Examiner*—Quan-Zhen Wang
(74) *Attorney, Agent, or Firm*—Katten Muchin Rosenman LLP

(57) ABSTRACT

A WDM optical transmission system of the invention has a configuration where WDM light generated at a wavelength multiplexing station is transmitted via a plurality of stations such as optical add-drop stations, arranged on an optical transmission line, and control of the power of the optical signals of respective wavelengths included in the WDM light is performed in the wavelength multiplexing station and the optical add-drop stations. A device is provided which communicates between stations, optical signals including information related to the control state of the optical signal power in each station, so that after control of the optical signal power at an upstream station is complete, control of the optical signal power at the downstream station is executed. As a result, stable control in respective stations can be performed even at the time of increasing or decreasing the number of wavelengths.

11 Claims, 16 Drawing Sheets

FIG.2

| No. | TITLE | | | | | | | | | CONTENTS |
|---|---|---|---|---|---|---|---|---|---|---|
| 0 | HEADER | | | | | | | | | |
| 1 | WCS | $\lambda_8$ | $\lambda_7$ | $\lambda_6$ | $\lambda_5$ | $\lambda_4$ | $\lambda_3$ | $\lambda_2$ | $\lambda_1$ | BIT INDICATING WAVELENGTH UNDER CHANNEL SERVICE |
| 2 | WCF | $\lambda_8$ | $\lambda_7$ | $\lambda_6$ | $\lambda_5$ | $\lambda_4$ | $\lambda_3$ | $\lambda_2$ | $\lambda_1$ | BIT INDICATING WAVELENGTH HAVING A FAILURE |
| 3 | WCC | $\lambda_8$ | $\lambda_7$ | $\lambda_6$ | $\lambda_5$ | $\lambda_4$ | $\lambda_3$ | $\lambda_2$ | $\lambda_1$ | BIT INDICATING WAVELENGTH FOR WHICH CONTROL OF OPTICAL SIGNAL POWER FOR ADDING OR DROPPING A WAVELENGTH IS BEING CARRIED OUT |
| 4 | WCA | $\lambda_8$ | $\lambda_7$ | $\lambda_6$ | $\lambda_5$ | $\lambda_4$ | $\lambda_3$ | $\lambda_2$ | $\lambda_1$ | BIT INDICATING WAVELENGTH FOR WHICH CONTROL OF OPTICAL SIGNAL POWER IS BEING CARRIED OUT UNDER CHANNEL SERVICE |

FIG.8

| No. | TITLE | | | | | | | | | CONTENTS |
|---|---|---|---|---|---|---|---|---|---|---|
| 0 | HEADER | | | | | | | | | |
| 1 | WCS | $\lambda_8$ | $\lambda_7$ | $\lambda_6$ | $\lambda_5$ | $\lambda_4$ | $\lambda_3$ | $\lambda_2$ | $\lambda_1$ | BIT INDICATING WAVELENGTH UNDER CHANNEL SERVICE |
| 2 | WCF | $\lambda_8$ | $\lambda_7$ | $\lambda_6$ | $\lambda_5$ | $\lambda_4$ | $\lambda_3$ | $\lambda_2$ | $\lambda_1$ | BIT INDICATING WAVELENGTH HAVING A FAILURE |
| 3 | WCC | $\lambda_8$ | $\lambda_7$ | $\lambda_6$ | $\lambda_5$ | $\lambda_4$ | $\lambda_3$ | $\lambda_2$ | $\lambda_1$ | BIT INDICATING WAVELENGTH FOR WHICH CONTROL OF OPTICAL SIGNAL POWER FOR ADDING OR DROPPING A WAVELENGTH IS BEING CARRIED OUT |
| 4 | WCA | $\lambda_8$ | $\lambda_7$ | $\lambda_6$ | $\lambda_5$ | $\lambda_4$ | $\lambda_3$ | $\lambda_2$ | $\lambda_1$ | BIT INDICATING WAVELENGTH FOR WHICH CONTROL OF OPTICAL SIGNAL POWER IS BEING CARRIED OUT UNDER CHANNEL SERVICE |
| 5 | 0 | 0 | 0 | 0 | 0 | 0 | 0 | 0 | TILT | BIT INDICATING COMPLETION OF TILT CONTRO |

FIG.10

| No. | TITLE | CONTENTS |
|---|---|---|
| 0~4 | HEADER, WCS, WCF, WCC, WCA | SAME AS FIG. 2 |
| 5 | FORWARD DIRECTION PRE-EMPHASIS REQUESTS $\lambda_1$ D7 D6 D5 D4 D3 D2 D1 D0 | ADDED PRE-EMPHASIS REQUIREMENT FROM UPSTREAM STATION TO DOWNSTREAM STATION |
| 6 | FORWARD DIRECTION PRE-EMPHASIS REQUESTS $\lambda_2$ D7 D6 D5 D4 D3 D2 D1 D0 | |
| 7 | FORWARD DIRECTION PRE-EMPHASIS REQUESTS $\lambda_3$ D7 D6 D5 D4 D3 D2 D1 D0 | |
| 8 | FORWARD DIRECTION PRE-EMPHASIS REQUESTS $\lambda_4$ D7 D6 D5 D4 D3 D2 D1 D0 | |
| 9 | FORWARD DIRECTION PRE-EMPHASIS REQUESTS $\lambda_5$ D7 D6 D5 D4 D3 D2 D1 D0 | |
| 10 | FORWARD DIRECTION PRE-EMPHASIS REQUESTS $\lambda_6$ D7 D6 D5 D4 D3 D2 D1 D0 | |
| 11 | FORWARD DIRECTION PRE-EMPHASIS REQUESTS $\lambda_7$ D7 D6 D5 D4 D3 D2 D1 D0 | |
| 12 | FORWARD DIRECTION PRE-EMPHASIS REQUESTS $\lambda_8$ D7 D6 D5 D4 D3 D2 D1 D0 | |
| 5 | BACKWARD DIRECTION PRE-EMPHASIS REQUESTS $\lambda_1$ D7 D6 D5 D4 D3 D2 D1 D0 | ADDED PRE-EMPHASIS REQUIREMENT FROM DOWNSTREAM STATION TO UPSTREAM STATION |
| 6 | BACKWARD DIRECTION PRE-EMPHASIS REQUESTS $\lambda_2$ D7 D6 D5 D4 D3 D2 D1 D0 | |
| 7 | BACKWARD DIRECTION PRE-EMPHASIS REQUESTS $\lambda_3$ D7 D6 D5 D4 D3 D2 D1 D0 | |
| 8 | BACKWARD DIRECTION PRE-EMPHASIS REQUESTS $\lambda_4$ D7 D6 D5 D4 D3 D2 D1 D0 | |
| 9 | BACKWARD DIRECTION PRE-EMPHASIS REQUESTS $\lambda_5$ D7 D6 D5 D4 D3 D2 D1 D0 | |
| 10 | BACKWARD DIRECTION PRE-EMPHASIS REQUESTS $\lambda_6$ D7 D6 D5 D4 D3 D2 D1 D0 | |
| 11 | BACKWARD DIRECTION PRE-EMPHASIS REQUESTS $\lambda_7$ D7 D6 D5 D4 D3 D2 D1 D0 | |
| 12 | BACKWARD DIRECTION PRE-EMPHASIS REQUESTS $\lambda_8$ D7 D6 D5 D4 D3 D2 D1 D0 | |

WAVELENGTH DIVISION MULTIPLEXING OPTICAL TRANSMISSION SYSTEM

BACKGROUND OF THE INVENTION (1) Field of the Invention

The present invention relates to a wavelength division multiplexing (WDM) optical transmission system having a function for controlling the optical signal power of each wavelength included in WDM light, and more specifically, relates to a technique for stabilizing control of the optical signal power for a WDM optical transmission system in which an optical add-drop station and an optical cross-connect station are arranged on an optical transmission line.

(2) Related Art

In the basic configuration of a conventional WDM optical transmission system, as shown for example in FIG. 12, a point-to-point configuration is generally used, in which optical signals of wavelengths $\lambda_1$ to $\lambda_3$ from transmitters (E/O) 101 are multiplexed by a wavelength multiplexing (MUX) station 102 to transmit the WDM light to an optical transmission line 103, and the WDM light is repeatedly transmitted, while being amplified by a repeating and amplifying station (REP) 104 arranged on the optical transmission line 103. The WDM light is then demultiplexed into optical signals of respective wavelengths by a wavelength demultiplexing (DEMUX) station 105, and received by optical receivers (O/E) 106 corresponding to each wavelength.

In this conventional configuration, variable optical attenuators (VOA) 102A are provided, which perform level adjustment for each wavelength, so that the wavelength optical powers of the multiplexed WDM light become uniform with respect to the wavelength multiplexing station 102. At the time of increasing or decreasing the number of wavelengths, the attenuation by the respective variable optical attenuators 102A is adjusted so as to control the power of optical signals of the respective wavelengths. A multiplexer 102B in the wavelength multiplexing station 102 is for multiplexing the optical signals output from the respective variable optical attenuators 102A to generate the WDM light. An optical amplifier 102C is for amplifying the WDM light output from the multiplexer 102B to a necessary level. A level adjuster 102D is for controlling the respective variable optical attenuators 102A by monitoring the optical power of the respective wavelengths in the WDM light output from the optical amplifier 102C.

For the repeating and amplifying station (REP) 104, there is a known technique (for example, see Japanese Unexamined Patent Publication No. 2000-244411), in which the total power of the WDM light output to the optical transmission line 103 is made uniform by applying automatic level control (ALC), and when the number of wavelengths in the WDM light fluctuates, automatic gain control (AGC) is performed to reduce the change in the gain-wavelength characteristic, thereby preventing deterioration in the transmission quality.

Recently, a WDM optical transmission system having an optical add-drop function for adding or dropping a part of the optical signals included in the WDM light on the optical transmission line directly in the state of light, without converting it to an electric signal, and an optical cross-connect function for changing over the optical path of the optical signal in each wavelength by wavelength conversion or the like has been developed. The configuration shown for example in FIG. 13 is one example of the conventional WDM optical transmission system in which adding or dropping of the optical signal of a wavelength $\lambda_3$ is performed by an optical add-drop (OADM) station 107 provided on the optical transmission line 103. In the case of the system configuration having a path changing station such as the optical add-drop station or the optical cross-connect station, it is necessary to equalize the power of optical signals of the respective wavelengths in the path changing stations, as in the point-to-point configuration. Therefore, it is necessary to control the optical power by using a variable optical attenuator (VOA) or the like corresponding to the respective wavelengths.

In the conventional WDM optical transmission system, when the point-to-point configuration as shown in FIG. 12 is used, the control of the power of the optical signals of the respective wavelengths is performed only in the wavelength multiplexing station 102, and the respective optical signals input to the wavelength multiplexing station 102 are light output from the respective optical transmitters 101, with the wavelength and the power adjusted to an appropriate level. On the other hand, in the case of the system configuration including the path changing station such as the optical add-drop station 107, as shown in FIG. 13, not only the wavelength multiplexing station 102 but also the optical add-drop station 107 control the optical signal power. As a result, the optical power is controlled in a plurality of places, until the optical signals output from the respective optical transmitters 101 are received by the respective optical receivers 106 via the optical transmission line 103.

When with respect to the conventional WDM optical transmission system including such a path changing station, the power of optical signals of the respective wavelengths is controlled by a method similar to the point-to-point configuration, there are problems described below.

In the configuration including the optical add-drop station 107 on the optical path from the wavelength multiplexing station 102 to the wavelength demultiplexing station 105 as shown in FIG. 13, when an increase in the number of wavelengths is performed the number of signals of different wavelengths is increased in the wavelength multiplexing station 102 on the upstream side, the optical signals of the increased wavelengths are input to the optical add-drop station 107 on the downstream side, and the optical add-drop station 107 starts addition control, triggered by the recovery of the input cut-off state of the relevant wavelength. Since the level adjuster in the optical add-drop station 107 has the same function as that of the level adjuster in the wavelength multiplexing station 102, if the power of the input optical signal is stable, the feedback control can be converged normally. However, at the time of increasing the number of wavelengths as mentioned above, the power of the input optical signal fluctuates dynamically. Therefore it becomes very difficult to adjust the optical signal power of the increased wavelength to an appropriate level by the optical add-drop station 107. As a result, increase in the number of wavelengths may not be completed normally, or retry of control has to be repeated, thereby taking a long time for activation (first problem).

FIGS. 14 and 15 show one specific example of the state at the time of increasing the number of wavelengths. For simplifying the explanation, as shown in FIG. 14, a configuration in which the repeating and amplifying station is omitted is assumed, wherein an output end of the wavelength multiplexing station 102 is designated as point A, an input end of the variable optical attenuator in the optical add-drop station 107 is designated as point B, and an output end of the optical add-drop station 107 is designated as point C. In FIG. 15, fluctuations in the optical signal power of the signal of the increased wavelength at the respective points are shown.

As in the example of FIG. 15, when the increase in wavelengths is started at time T0, the optical signal power of the increased wavelength at point A increases. At the time of starting to increase the number of wavelengths, the wavelength multiplexing station 102 controls the variable optical attenuators so that the optical signal power becomes a desired level. Moreover, the optical add-drop station 107 starts the control of the optical signal power of the increased wavelength, triggered when the optical signal power of the increased wavelength, which has been in the input cut-off state, exceeds a predetermined threshold (input cut-off recovery threshold) $P_{TH}$ at time T1. At this time, the optical signal power of the increased wavelength input to the variable optical attenuator in the optical add-drop station 107 dynamically fluctuates from time T0 to time T2, during which time the increase in the number of wavelengths is controlled by the wavelength multiplexing station 102 on the upstream side. Therefore, from time T1 to time T2, the control of the optical signal power of the increased wavelength by the wavelength multiplexing station 102 and the control of the optical signal power of the increased wavelength by the optical add-drop station 107 are performed at the same time, and the control state by the optical add-drop station 107 on the downstream side becomes unstable due to the influence of fluctuations in the optical signal power caused by the parallel control. As a result, the optical signal power of the increased wavelength at point C is not converged to the desired level, until a certain period of time has passed after completion of control on the upstream side to reach time T3. Particularly, when the optical add-drop stations (or the optical cross-connect stations) are connected in multiple stages, the influence of such a state becomes noticeable, thereby causing a problem.

Moreover, in addition to the first problem, the optical amplifiers provided in the wavelength multiplexing station and the repeating and amplifying station amplify and output signal components in the WDM light, and at the same time, output the spontaneously emitted light (ASE) as noise components. The noise light generated in the optical amplifiers remains in the output light from the wavelength multiplexing station 102 (see point A in FIG. 16), even when the optical signal is not output from the optical transmitter 101 for the wavelength $\lambda_1$ (a decrease of the signal of the wavelength $\lambda_1$) as shown in FIG. 16. Hence, the optical power of the wavelength $\lambda_1$ input to the optical add-drop station 107 on the downstream side does not become zero (see point B in FIG. 16). Therefore, even when the wavelength $\lambda_1$ is decreased in the transmission section on the upstream side, the optical add-drop station 107 may not be able to detect the input cut-off of the signal components, due to the ASE corresponding to the wavelength $\lambda_1$. In this case, unnecessary light of only the ASE without including the signal component, is output from the optical add-drop station 107 for the wavelength $\lambda_1$ (see point C in FIG. 16), and is further transmitted to the downstream side, thereby causing deterioration in the transmission characteristics of the WDM light (second problem).

Furthermore, in order to ensure high reliability, in the communication system, it is generally important that maintenance personnel can determine a problematic point in a short period of time at the time of failure. However, in the conventional system configuration including the path changing station such as the optical add-drop station, since the path changeover of the optical signals of the respective wavelengths included in the WDM light is carried out at a plurality of places, a failure on the upstream side affects the downstream side. Therefore, an abnormality at one place affects a plurality of places, thereby making it difficult to determine the fundamental problematic point in a short period of time (third problem).

In addition, other than the case in which the optical signals of the respective wavelengths included in the WDM light are increased or decreased, for example, when the optical signal power of the signals of the respective wavelengths changes due to fluctuations in the loss of the optical fibers, a similar situation to that of the first problem may occur. In other words, in the conventional configuration shown in FIG. 13, when the loss in the optical fibers fluctuates, the optical signal power level also changes. Therefore, the level adjusters in the wavelength multiplexing station 102 and the optical add-drop station 107 control the optical signal power, to perform the control for the whole system so that the level fluctuations can be absorbed (compensated). At this time, if the control of the optical signal power in the respective stations is performed at the same time, a change in the optical signal power due to the control on the upstream side affects the control on the downstream side, thereby taking a long time for the optical signal power control. Moreover, according to circumstances, oscillation may occur to make it difficult to perform normal control (fourth problem).

SUMMARY OF THE INVENTION

The present invention has been accomplished in view of the above problems, and it is a first object of the present invention to enable stable control in respective stations even at the time of increasing or decreasing the number of wavelengths, in a WDM light transmission system, when the control of the optical signal power of the respective wavelengths included in the WDM light is executed in a plurality of stations on the optical transmission line. It is a second object of the present invention to ensure excellent transmission quality by reducing the effect of noise light generated on the optical transmission line at the time of increasing or decreasing the number of wavelengths. It is a third object of the present invention to facilitate determination of a problematic point at the time of failure. Moreover, it is a fourth object of the present invention to be able to execute stable control of the optical signal power of the respective wavelengths, other than in the case where the number of respective wavelengths is increased or decreased.

In order to achieve the above objects, one aspect of the WDM optical transmission system of the present invention is a WDM optical transmission system including at least one wavelength multiplexing station which controls power of a plurality of optical signals of different wavelengths, multiplexes the optical signals of the respective wavelengths to generate WDM light, and outputs the WDM light to an optical transmission line, and at least one wavelength demultiplexing station which demultiplexes the WDM light received via the optical transmission line to control the power of the optical signals of the respective wavelengths constituting the WDM light, and comprising an information communication unit which communicates a signal including information relating to a control state of the power of optical signals of the respective wavelengths included in the WDM light, between the wavelength multiplexing station and the wavelength demultiplexing station, and the wavelength demultiplexing station executes control of the power of optical signals of the respective wavelengths in its own station, after having determined the completion of control of the power of optical signals of the respective wavelengths in other stations located on the upstream side of its own station, based on information obtained by the information communication unit.

Another aspect of the WDM optical transmission system of the present invention is a WDM transmission system in which a plurality of optical signals of different wavelengths is multiplexed in a wavelength multiplexing station to generate WDM light, and the WDM light is repeatedly transmitted via a plurality of stations arranged on an optical transmission line, and at least one of the plurality of stations on the optical transmission line is a path changing station which changes the path of the optical signals of the respective wavelengths included in the WDM light, and the wavelength multiplexing station and the path changing station respectively control the power of the optical signals of the respective wavelengths included in the WDM light, and comprises an information communication unit which communicates a signal including information relating to the control state of the power of the optical signals of the respective wavelengths included in the WDM light, between the wavelength multiplexing station and the path changing station, and the path changing station executes control of the power of the optical signals of the respective wavelengths in its own station, after having determined the completion of control of the power of the optical signals of the respective wavelengths in other stations located on the upstream side of its own station, based on information obtained by the information communication unit.

In the WDM optical transmission system in the above aspects, information relating to the control state in its own station where control of the power of optical signals of the respective wavelengths included in the WDM light is performed, is communicated between the respective stations by the information communication unit, and upon completion of the control of the optical signal power in the other stations located on the upstream side of its own station on the optical transmission line, the control of the optical signal power in its own station on the downstream side is executed. Therefore, such a situation where the control of the power of optical signals of the respective wavelengths is performed simultaneously in a plurality of stations on the optical transmission line can be avoided, and stable control can be performed.

In the WDM optical transmission system, the configuration may be such that the information communication unit communicates a signal including wavelength channel service information indicating the wavelength of an optical signal under channel service included in the WDM light, and wavelength channel change information indicating the wavelength of an optical signal for which control of the optical signal power is being executed, at a time of increasing or decreasing the number of wavelengths, and the path changing station determines the increased wavelength for which control of the optical signal power is being executed in another station located on the upstream side of its own station, based on the wavelength channel service information and the wavelength channel change information obtained by the information communication unit, puts the control of the optical signal power of the increased wavelength in its own station into a stand-by state, and then upon completion of the control in the other station, releases the stand-by state. Moreover, the path changing station may determine a decreased wavelength based on the wavelength channel service information and the wavelength channel change information obtained by the information communication unit, to determine an input cut-off state of the optical signal of the decreased wavelength in its own station, regardless of noise light level. According to such a configuration, at the time of increasing or decreasing the number of wavelengths, the wavelength multiplexing station and the path changing station can stably control the optical signal power of the wavelength to be increased or decreased.

Moreover, in the WDM optical transmission system, the configuration may be such that the information communication unit communicates a signal including wavelength channel fail information indicating a wavelength of an optical signal having a failure, and the path changing station determines the wavelength of an optical signal for which an input cut-off state occurs in another station located on the upstream side of its own station, based on the wavelength channel service information and the wavelength channel fail information obtained by the information communication unit, so as to perform masking processing of an input cut-off alarm issued in its own station for the wavelength. According to such a configuration, the input cut-off alarm is generated in a station closest to the failure spot, and the input cut-off alarm is masked at stations on the downstream side, thereby enabling easy determination of the problematic spot in a short period of time.

Furthermore, in the WDM optical transmission system, the configuration may be such that the information communication unit communicates a signal including wavelength channel fail information indicating a wavelength of an optical signal having a failure, and wavelength channel absorbing information indicating a wavelength of an optical signal for which control for absorbing fluctuations in the optical signal power level is being executed, and the path changing station determines the wavelength of the optical signal for which control for absorbing fluctuations in the optical signal power level is being executed in another station located on the upstream side of its own station, based on the wavelength channel service information, the wavelength channel fail information, and the wavelength channel absorbing information obtained by the information communication unit, puts the control for absorbing the level fluctuations in the wavelength in its own station into a stand-by state, and then upon completion of the control for absorbing the level fluctuations in the other station, releases the stand-by state. According to such a configuration, even when level fluctuations occur in the power of optical signals of the respective wavelengths due to a factor other than the increase or decrease in the number of wavelengths, control for absorbing (compensating) the level fluctuations can be stably performed in the wavelength multiplexing station and the path changing station.

Other objects, features and advantages of the present invention will become apparent from the following explanation of the embodiments, in conjunction with the appended drawings.

BRIEF DESCRIPTION OF THE DRAWINGS

FIG. 2 is a diagram showing a format example of an optical supervisory channel applied to the first embodiment.

FIG. 8 is a diagram showing a format example of an optical supervisory channel applied to the second embodiment.

FIG. 10 is a diagram showing a format example of an optical supervisory channel applied to the third embodiment.

DETAILED DESCRIPTION OF THE INVENTION

There will be described embodiments for implementing the WDM optical transmission system of the present invention, with reference to the accompanying drawings. The same reference symbols denote the same or equivalent parts in all drawings.

Figure 1:
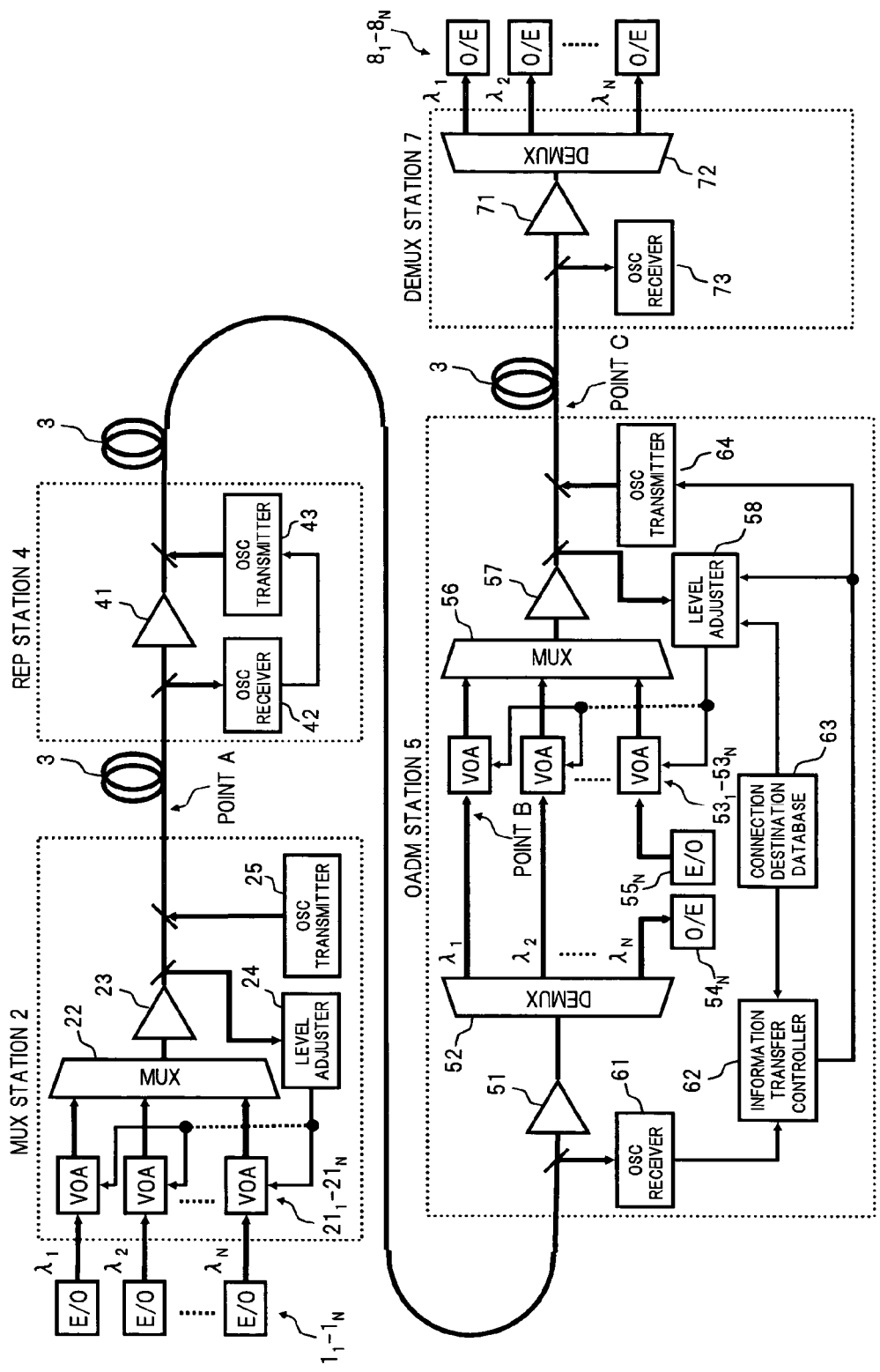
FIG. 1 is a diagram showing a configuration of a WDM optical transmission system according to a first embodiment of the present invention.

FIG. 1 is a diagram showing a configuration of a WDM optical transmission system according to a first embodiment of the present invention.

In FIG. 1, a WDM optical transmission system in the present embodiment comprises, for example: a plurality of (here, N) optical transmitters (E/O) $1_1$ to $1_N$; a wavelength multiplexing (MUX) station 2 which multiplexes optical signals output from the respective optical transmitters $1_1$ to $1_N$ to generate WDM light and transmits the WDM light to an optical transmission line 3 together with an optical supervisory channel (OSC); a repeating and amplifying station (REP) 4 arranged on the optical transmission line 3 for amplifying and outputting the input WDM light; an optical add-drop station (OADM) 5 arranged on the optical transmission line 3 for changing over the path of optical signals of respective wavelengths; a wavelength demultiplexing (DEMUX) station 7 which generates optical signals of respective wavelengths by demultiplexing the WDM light propagating on the optical transmission line 3; and a plurality of optical receivers (O/E) $8_1$ to $8_N$ which respectively receive and process the respective optical signals output from the wavelength demultiplexing station 7.

The respective optical transmitters $1_1$ to $1_N$ are general optical transmitters, which respectively generate optical signals of mutually different wavelengths modulated according to transmission data. Here the wavelengths of the respective optical signals output from the N optical transmitters $1_1$ to $1_N$ to the wavelength multiplexing station 2 are denoted by $\lambda_1$ to $\lambda_N$.

The wavelength multiplexing station 2 includes, for example: N variable optical attenuators (VOA) $21_1$ to $21_N$ respectively corresponding to the respective wavelengths $\lambda_1$ to $\lambda_N$; a multiplexer (MUX) 22 which multiplexes the optical signals having passed the respective variable optical attenuators $21_1$ to $21_N$; an optical amplifier 23 which amplifies the WDM light output from the multiplexer 22; a level adjuster 24 which adjusts the attenuation of the respective optical attenuators 21 to control the power of optical signals of the respective wavelengths $\lambda_1$ to $\lambda_N$ output from the wavelength multiplexing station 2; and an OSC transmitter 25 which generates the optical supervisory channel and transmits it to the optical transmission line 3 together with the WDM light output from the optical amplifier 23. As in the conventional configuration, the level adjuster 24 separates a part of the WDM light output from the optical amplifier 23 to monitor the power of optical signals of the respective wavelengths $\lambda_1$ to $\lambda_N$, and feedback-controls the corresponding variable optical attenuators $21_1$ to $21_N$ so that the respective optical signals become a desired level according to the monitoring result. The optical supervisory channel transmitted from the OSC transmitter 25 is an optical signal including information relating to the WDM light transmitted by the system. Here light of a wavelength different from the optical signal output from the respective optical transmitters 1 is used.

The optical supervisory channel includes: wavelength channel service (hereinafter referred to as WCS) information indicating the wavelengths of optical signals under channel service included in the WDM light; wavelength channel fail (hereinafter referred to as WCF) information indicating the wavelength of an optical signal having a failure; wavelength channel change (hereinafter referred to as WCC) information indicating the wavelengths of optical signals in action of controlling the optical signal power at the time of increasing or decreasing the wavelengths (adding or dropping a signal of a certain wavelength); and wavelength channel absorbing (hereinafter referred to as WCA) information indicating the wavelength of an optical signal in action of controlling the optical signal power during the channel service. The WCS information and the WCF information of these types of information are information existing in the optical supervisory channel used in the conventional WDM optical transmission system, and the WCC information and the WCA information are information newly added in the present invention. The details of the optical supervisory channel will be described later.

The repeating and amplifying station 4 includes, for example, an optical amplifier 41, an OSC receiver 42, and an OSC transmitter 43. The optical amplifier 41 is formed by using a known optical amplifier capable of collectively amplifying the input WDM light propagating on the optical transmission line 3. The OSC receiver 42 extracts the optical supervisory channel from the input optical signals provided from the optical transmission line 3 to the optical amplifier 42, and recognizes various types of information included in the optical supervisory channel. The WCS information and the WCF information of the information recognized by the OSC receiver 42 are used for the operation control of the optical amplifier 41 as in the conventional case. The OSC transmitter 43 generates the optical supervisory channel according to the information recognized by the OSC receiver 42, and transmits this optical supervisory channel to the optical transmission line 3 together with the WDM light output from the optical amplifier 41, in order to directly transfer various types of information recognized by the OSC receiver 42 to the downstream side.

In the optical add-drop station 5, the optical amplifier 51 collectively amplifies the WDM light input from the optical transmission line 3, and then the wavelength demultiplexer (DEMUX) 52 demultiplexes the WDM light into optical signals of the respective wavelengths $\lambda_1$ to $\lambda_N$. Of the respective optical signals demultiplexed by the demultiplexer 52, an optical signal of a wavelength separated (dropped) at the node (the wavelength $\lambda_N$ in FIG. 1) is transmitted to an optical receiver (O/E) $54_N$, and optical signals of other wavelengths are transmitted to the variable optical attenuators (VOA) $53_1$, $53_2$ and the like corresponding to each of these. The optical signal of the wavelength inserted (added) to the optical transmission line 3 at the node (the wavelength $\lambda_N$ in FIG. 1) is generated by the optical transmitter (E/O) $55_N$, and transmitted to the variable optical attenuator $53_N$ corresponding to that optical signal. The optical signals of the respective wavelengths $\lambda_1$ to $\lambda_N$ level-adjusted by the respective variable optical attenuators $53_1$ to $53_N$ are re-multiplexed by the multiplexer (MUX) 56, and then collectively amplified by the optical amplifier 57 and output to the optical transmission line 3.

Moreover, in the optical add-drop station 5, in the OSC receiver 61 the optical supervisory channel is extracted from the input optical signals provided to the optical amplifier 51, and the various types of information included in the optical supervisory channel is recognized and transmitted to an information transfer controller 62. The information transfer controller 62 transfers the various types of information from the OSC receiver 61 to the level adjuster 58, for the signals of the wavelengths directly and optically connected without using the optical receiver $54_N$ and the optical transmitter $55_N$, based on the information stored in a connection destination database 63. For example, a serial interface or the like is used for the information transfer. The level adjuster 58 separates a part of the WDM light output by the optical amplifier 57 to monitor the power of optical signals of the respective wavelengths $\lambda_1$ to $\lambda_3$, and generates a control signal for adjusting the attenuation of the respective variable optical attenuators $53_1$ to $53_N$ corresponding to the monitoring result and the transfer information from the information transfer controller 62, while referring to the stored information in the connection destination database 63. Here, the respective variable optical attenuators $53_1$ to $53_N$ and the level adjuster 58 function as an optical signal power controller. The OSC transmitter 64 generates the optical supervisory channel to be transferred to the downstream side according to the information transmitted from the OSC receiver 61 via the information transfer controller 62, and the optical supervisory channel is transmitted to the optical transmission line 3 together with the WDM light output from the optical amplifier 57.

The wavelength demultiplexing station 7 includes, for example, an optical amplifier 71, a demultiplexer (DEMUX) 72, and an OSC receiver 73. The optical amplifier 71 is formed by using a known optical amplifier capable of collectively amplifying the WDM light propagating on the optical transmission line 3. The demultiplexer 72 demultiplexes the WDM light output from the optical amplifier 71 into optical signals of wavelengths $\lambda_1$ to $\lambda_N$, and outputs the respective optical signals to the optical receivers (O/E) $8_1$ to $8_N$ corresponding to the respective wavelengths. The OSC receiver 73 extracts the optical supervisory channel from the input optical signals provided to the optical amplifier 71, and recognizes various types of information included in the optical supervisory channel. The WCS information and the WCF information of the information recognized by the OSC receiver 73 are used for the operation control of the optical amplifier 71 and for reception processing of the optical signals by the respective optical receivers $8_1$ to $8_N$ as in the conventional case. Here, a case where the power of optical signals of the respective wavelengths is not controlled in the wavelength demultiplexing station 7 is shown, but the power of optical signals of the respective wavelengths may be controlled in the wavelength demultiplexing station 7, as in the wavelength multiplexing station 2 and the optical add-drop station 5.

Next the operation of the first embodiment will be described.

In the WDM optical transmission system having the above described configuration, as the information carried on the optical supervisory channel and communicated between the wavelength multiplexing station 2, the repeating and amplifying station 4, the optical add-drop station 5, and the wavelength demultiplexing station 7, not only the WCS (wavelength channel service) and the WCF (wavelength channel fail) information used in the conventional system, but also the WCC (wavelength channel change) information and the WCA (wavelength channel absorbing) information are newly included. Moreover, by performing control such as level adjustment of the signals of respective wavelengths in the wavelength multiplexing station 2 and the optical add-drop station 5 based on these types of information, the first to the fourth problems in the aforementioned conventional configuration can be solved. Hereunder the operation of the optical transmission system will be described, focusing on the contents of the control using such an optical supervisory channel.

At first, the optical supervisory channel communicated between stations in the system will be specifically described, with reference to the format example of FIG. 2.

The example in FIG. 2 corresponds to one obtained by extending the format of the optical supervisory channel also used in the conventional point-to-point configuration. Here, N=8 is assumed as the number of wavelengths of the optical signals included in the WDM light. The optical supervisory channel corresponding to the point-to-point configuration is an optical signal generally used exclusively for supervisory control of the system, which is obtained by modulating an optical signal of a wavelength different from the main signal light at a speed of normally about 1 to 150 Mbps, with necessary information carried thereon, and multiplexing the optical signal with the main signal light, and is transmitted to the optical transmission line. Then the optical supervisory channel transmitted to the optical transmission line is demultiplexed from the main signal light at the output end of the optical transmission line and terminated (received). When there is another station on the downstream side, an optical supervisory channel in the same format is generated and transmitted to the optical transmission line on the downstream side.

In the format example in FIG. 2, the header in the 0th item, the WCS in the first item, and the WCF in the second item are parts the same as the conventional format, and the WCC in the third item and the WCA in the fourth item are the parts extended in the embodiment. Specifically, as for the eight bits allocated to the WCS, a "1" is inserted into a bit corresponding to a signal of a wavelength used in the channel service, and a "0" is inserted into a bit corresponding to a wavelength unused in the channel service. Moreover, as for the eight bits allocated to the WCF, a "1" is inserted into a bit corresponding to a signal of a wavelength in an input cut-off state having a failure, and a "0" is inserted into a bit corresponding to a signal of a wavelength in the normal state. Furthermore, as for the eight bits allocated to the WCC, a "1" is inserted into a bit corresponding to a wavelength in which increase or decrease control is being carried out as described later, and a "0" is inserted into a bit corresponding to a wavelength in which the increase or decrease control is not being carried out. In addition, as for the eight bits allocated to the WCA, a "1" is inserted into a bit corresponding to a wavelength in which control for absorbing (compensating) level fluctuations is being carried out as described later, and a "0" is inserted into a bit corresponding to a wavelength in which the control for absorbing (compensating) level fluctuations is not being carried out.

The information included in the optical supervisory channel is not limited to the example shown in FIG. 2, and may include other types of information carried on the optical supervisory channel communicated between the stations in a general WDM optical transmission system, for example, information for performing automatic power shutdown (APSD) control, information for alarm indication, and information for performing an AGC/ALC changeover instruction in the optical amplifier.

In the WDM optical transmission system in the embodiment, the optical supervisory channel in the above described format is generated by the OSC transmitter 25 in the wavelength multiplexing station 2, transmitted to the optical transmission line 3 together with the WDM light (main signal light), and then transmitted between stations to the wavelength demultiplexing station 7 passing in sequence through the repeating and amplifying station 4 and the optical add-drop station 5.

Here, the operation at the time of adding a wavelength will be specifically described.

For example, when the wavelength $\lambda_1$ corresponding to a through wavelength (a wavelength directly optically connected without using the optical receiver $54_N$ and the optical transmitter $55_N$) in the optical add-drop station 5 is assumed as the added wavelength, an optical transmitter $1_1$, which has been in an output suspended state before the addition, starts to output the optical signal of the wavelength $\lambda_1$ to the wavelength multiplexing station 2. In the wavelength multiplexing station 2, on receiving release from the input cut-off state of an optical signal with respect to the variable optical attenuator $21_1$, the attenuation of the variable optical attenuator $21_1$ is feedback-controlled according to a control signal from the level adjuster 24, so that the power of the optical signal of the added wavelength $\lambda_1$ included in the WDM light multiplexed by the multiplexer 22 and then amplified by the optical amplifier 23 becomes stable at a predetermined level, as in the conventional case. As a result, the power of the optical signal of the wavelength $\lambda_1$ output from the wavelength multiplexing station 2 to the optical transmission line 3 largely varies, as shown in the graph at point A in FIG. 3, from time T0 when the wavelength addition is started to time T2 when a necessary time has passed. The time from time T0 to time T2 is the time during which the addition control with respect to the wavelength $\lambda_1$ is being performed in the wavelength multiplexing station 2. Therefore, in the optical supervisory channel generated in the OSC transmitter 25 in the wavelength multiplexing station 2, respective bits corresponding to the added wavelength $\lambda_1$ are respectively set to WCS ($\lambda_1$)="1", WCF ($\lambda_1$)="0", WCC ($\lambda_1$)="1" and WCA ($\lambda_1$)="0", during the period of from time T0 to time T2. Then after time T2 when the addition control has finished, the bit value of WCC ($\lambda_1$) is changed from "1" to "0". The optical supervisory channel set as described above is transmitted to the optical transmission line 3 together with the WDM light in which the wavelength $\lambda_1$ has been added, and then transmitted toward the repeating and amplifying station 4.

In the repeating and amplifying station 4, as in the conventional configuration, the WDM light input from the wavelength multiplexing station 2 via the optical transmission line 3 is collectively amplified by the optical amplifier 41, and transmitted to the optical transmission line 3 on the downstream side. At this time, the optical supervisory channel included in the input light is extracted by the OSC receiver 42. Here, of the various types of information included in the optical supervisory channel, the WCS and the WCF are recognized and used for the operation control of the optical amplifier 41. On the other hand, since the WCC and the WCA are not used in the repeating and amplifying station 4, these types of information are not subjected to any processing, and are directly transferred to the OSC transmitter 43 together with other types of information. The OSC transmitter 43 generates an optical supervisory channel similar to the optical supervisory channel transmitted from the wavelength multiplexing station 2 and transmits the signal to the optical transmission line 3 together with the WDM light, toward the optical add-drop station 5 on the downstream side.

In the optical add-drop station 5, the optical supervisory channel input together with the WDM light from the upstream side is extracted by the OSC receiver 61, and various types of information, that is, WCS, WCF, WCC and WCA included in the optical supervisory channel are recognized and transmitted to the information transfer controller 62. The information transfer controller 62 refers to connection destination data stored in the connection destination database 63, more specifically, to data relating to the add-drop wavelength to be processed by the optical receiver $54_N$ and the optical transmitter $55_N$ at the relevant node, and the through wavelength directly optically connected without using the optical receiver $54_N$ and the optical transmitter $55_N$, selects the information corresponding to the through wavelength, of the respective types of information corresponding to the respective wavelengths recognized by the OSC receiver 61, and transfers the selected information to the level adjuster 58.

The level adjuster 58 discriminates the added wavelength based on the information of the WCS, WCF, WCC and WCA transferred from the information transfer controller 62, and determines whether the control of the optical signal power for the added wavelength is being executes in an upstream station. This discrimination is performed, specifically, by detecting that WCS ($\lambda_1$)="1", and WCC ($\lambda_1$)="1", to determine that the wavelength $\lambda_1$ is the added wavelength. While the bit value of the WCC ($\lambda_1$) is "1", it is determined that the addition control is now being executes in an upstream station, and completion of the addition control is determined when the bit value is changed to "0". Here, at time T0, the start of addition of the wavelength $\lambda_1$ is determined, and during the period of from time T0 to time T2, it is determined that the control of the optical signal power for the added wavelength $\lambda_1$ is being executes in an upstream station.

Figure 3:
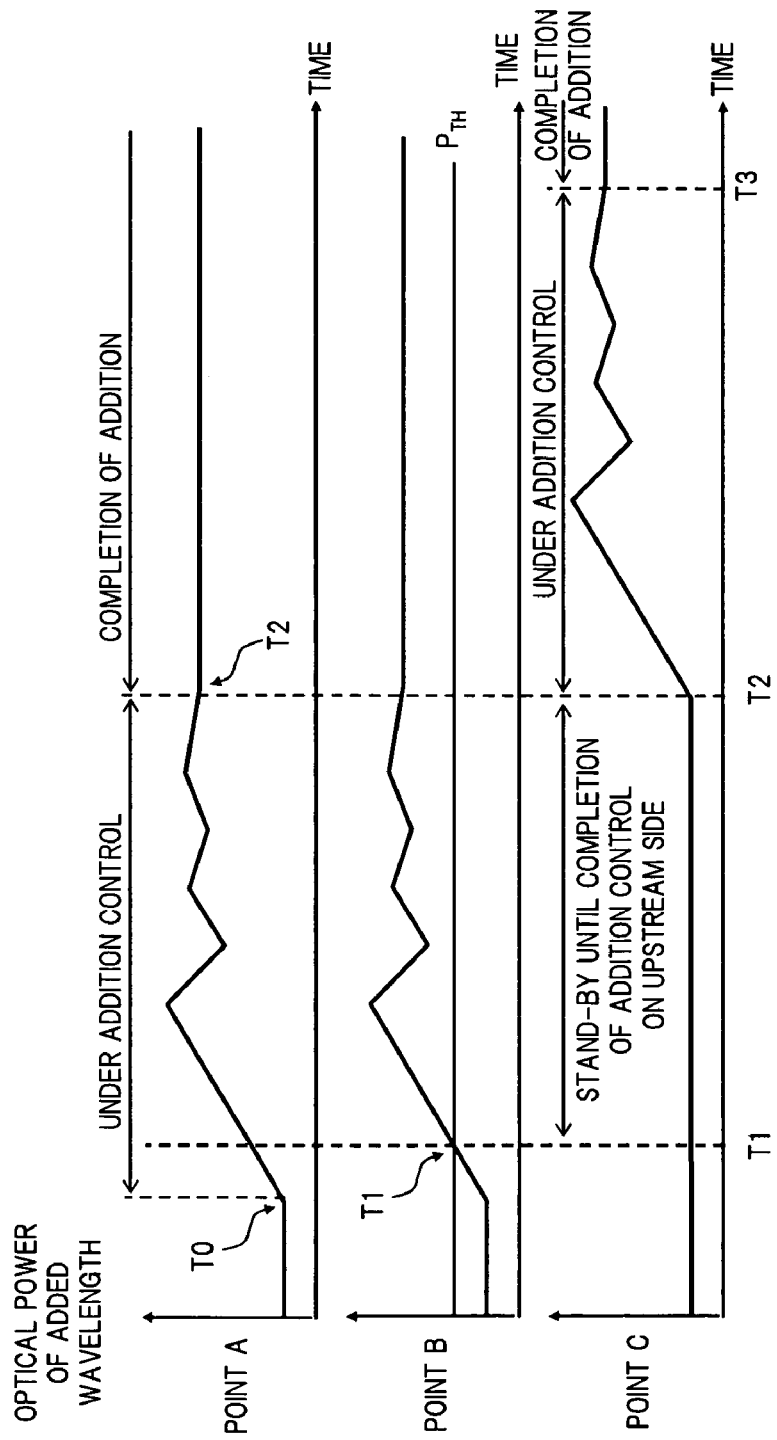
FIG. 3 is a diagram showing time variations in the optical power of a signal of an increased wavelength in the first embodiment.

Since the determination processing is performed based on the information of the optical supervisory channel, the level adjuster 58, as shown in the graph of point B in FIG. 3, does not start the feedback control of the optical signal power for the wavelength $\lambda_1$ as in the conventional configuration, even when the optical signal power input to the variable optical attenuator $53_1$ increases due to the addition of the wavelength $\lambda_1$ and exceeds an input cut-off recovery threshold $P_{TH}$ at T1, and maintains the setting of the variable optical attenuator $53_1$ before the addition of the wavelength to keep it in a stand-by state. Then when the completion of the addition control in the upstream station is determined at time T2, the level adjuster 58 releases the stand-by state, to start the feedback control of the optical signal power for the wavelength $\lambda_1$.

By such a control in the level adjuster 58, the situation in the conventional configuration where the addition control for the wavelength $\lambda_1$, is executed at the same time in a plurality of stations on the optical transmission line 3 is avoided. As a result, as shown in the graph for point C in FIG. 3, the optical signal power for the added wavelength $\lambda_1$ output from the optical add-drop station 5 can be stably controlled to a necessary level in a short period of time. Moreover, in the control of the optical signal power for wavelengths other than the added wavelength $\lambda_1$, since the addition control is performed not for the whole WDM light but for each wavelength, the control state before the addition of the wavelength can be maintained, and the influence of the added wavelength on the whole system can be reduced to the minimum.

Next the operation at the time of dropping a signal of a certain wavelength will be specifically described.

When an optical signal of a certain wavelength included in the WDM light is dropped, since the wavelength dropped in an upstream station becomes an unnecessary optical signal, it may be also dropped in a downstream station, and hence the adjustment processing in the whole system where control is performed in order of from the upstream side, such as control performed at the time of wavelength adding as described above, is not necessary. However, as the second problem in the conventional configuration, as mentioned before there is a problem in that the downstream station cannot detect that the optical signal of the dropped wavelength becomes the input cut-off state, due to the spontaneously emitted light (ASE) generated in the optical amplifier provided in the respective stations on the optical transmission line 3. It is necessary to avoid this problem. Therefore, in the embodiment, by using the information of the WCS and the WCC included in the optical supervisory channel communicated between stations, the optical signal dropped in the downstream station can be determined without being affected by the ASE.

Specifically, for example, when the wavelength $\lambda_1$ is assumed as the dropped wavelength, the operation of the optical transmitter $1_1$ is turned into a suspended state, so that the optical signal of the wavelength $\lambda_1$ transmitted to the variable optical attenuator $21_1$ in the wavelength multiplexing station 2 becomes the input cut-off state. At this time, in the optical supervisory channel generated by the OSC transmitter 25, respective bits corresponding to the dropped wavelength $\lambda_1$ are respectively set to WCS $(\lambda_1)$="0", WCF $(\lambda_1)$="0", WCC $(\lambda_1)$="1", and WCA $(\lambda_1)$="0". The optical supervisory channel set in this manner includes the ASE generated in the optical amplifier 23, and the optical supervisory channel is transmitted to the optical transmission line 3 together with the WDM light in which the optical signal of the wavelength $\lambda_1$ is dropped, and then transmitted toward the repeating and amplifying station 4.

In the repeating and amplifying station 4, as in the aforementioned case at the time of adding the wavelength, the WCS and the WCF included in the optical supervisory channel are used to collectively amplify the WDM light corresponding to the number of wavelengths after dropping, and the optical supervisory channel is directly transferred toward the optical add-drop station 5 on the downstream side. Also in the repeating and amplifying station 4, the ASE generated in the optical amplifier 41 is added to the WDM light as the noise component.

In the optical add-drop station 5, the optical supervisory channel input together with the WDM light including the ASE from the upstream side is extracted and recognized by the OSC receiver 61, as in the aforementioned case at the time of adding the wavelength, and various types of information included in the optical supervisory channel are transmitted to the information transfer controller 62. The information transfer controller 62 refers to the connection destination data stored in the connection destination database 63, and transfers the information corresponding to the through wavelength, of the information recognized by the OSC receiver 61, to the level adjuster 58.

Figure 16:
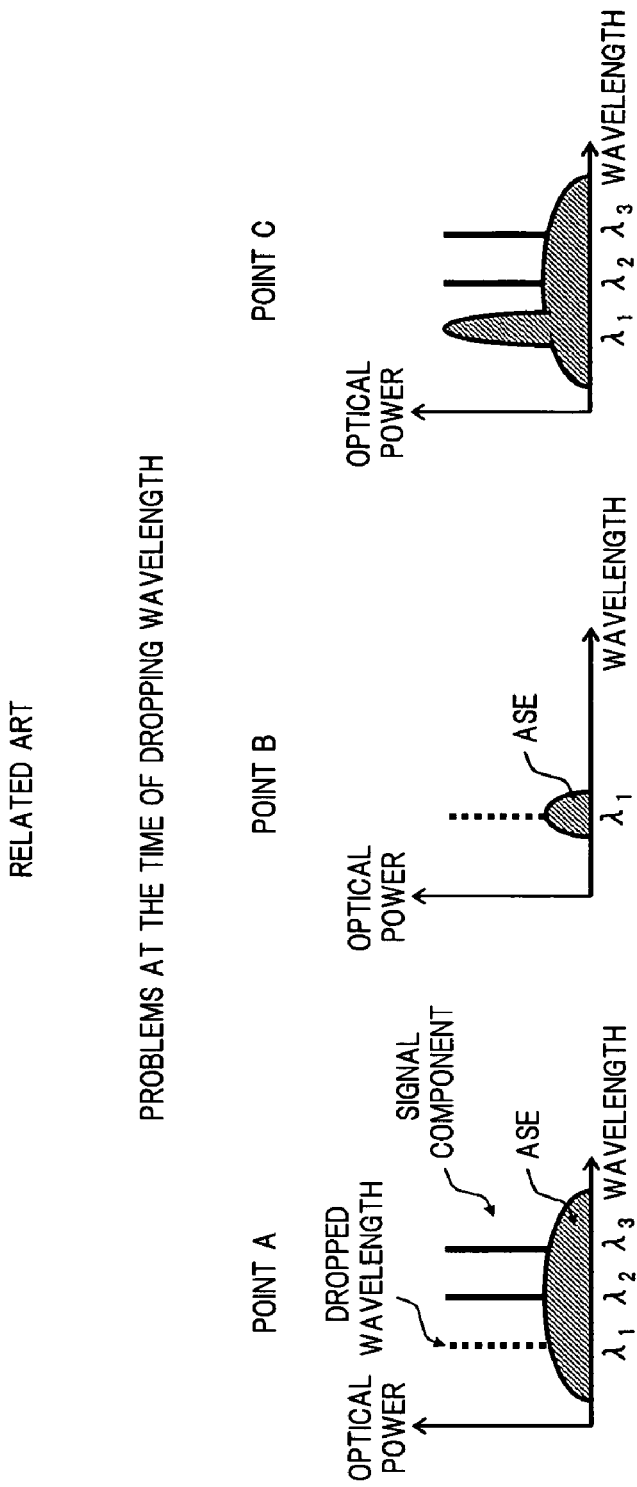
FIG. 16 is a diagram for explaining problems at the time of decreasing the number of signals of different wavelengths in the conventional WDM optical transmission system.

The level adjuster 58 discriminates the dropped wavelength based on the information transferred from the information transfer controller 62. In the discrimination of the dropped wavelength, specifically it is detected that WCS $(\lambda_1)$="0", and WCC $(\lambda_1)$="1", to determine that the wavelength $\lambda_1$ is the dropped wavelength. The level adjuster 58 having discriminated the dropped wavelength $\lambda_1$ determines that the optical signal of the wavelength $\lambda_1$ is in the input cut-off state, even if the power of the input light to the variable optical attenuator $53_1$ corresponding to the dropped wavelength $\lambda_1$ does not become a level lower than the input cut-off threshold due to the ASE accumulated on the upstream side, to perform dropping control such as making the attenuation of the variable optical attenuator $53_1$, the maximum level. As a result, the situation where the ASE corresponding to the wavelength $\lambda_1$ accumulated on the upstream side is amplified due to wrong determination of the input cut-off and output to the downstream side (see the graph of point C in FIG. 16) as in the conventional configuration is avoided.

Next the operation at the time of failure will be specifically described now.

Figure 4:
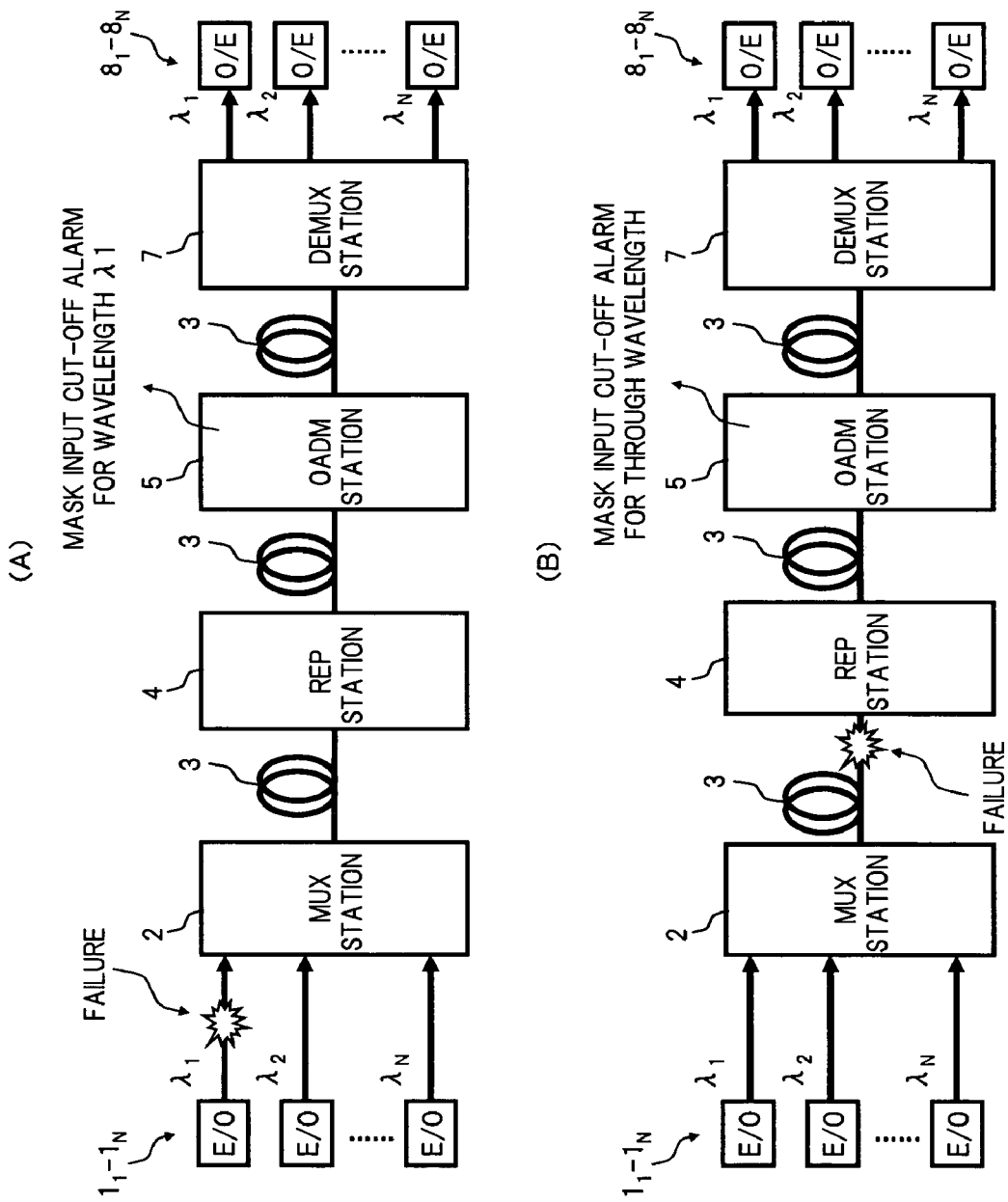
FIG. 4 is a diagram for explaining the operation at the time of failure in the first embodiment.

For example, as shown in (A) of FIG. 4, when a failure occurs on the optical path between the optical transmitter $1_1$ and the wavelength multiplexing station 2, and transmission of the optical signal of the wavelength $\lambda_1$ is suspended, or as shown in (B) of FIG. 4, when a failure such as disconnection occurs on the optical transmission line 3 located on the upstream side of the optical add-drop station 5 and the transmission of the whole WDM light is suspended, in the conventional configuration, an input cut-off alarm is generated in various places in the optical add-drop station 5 on the downstream side due to the influence of the failure on the upstream side. However, the input cut-off alarm generated in the optical add-drop station 5 is issued due to the failure on the upstream side, not because of a failure in its own station. In the conventional configuration, such an input cut-off alarm is issued in the respective stations located on the downstream side of the failure section. Therefore there is the aforementioned third problem in that it is difficult to determine the fundamental problematic place in a short period of time.

With respect to the third problem, in this embodiment, for example for the case of (A) of FIG. 4, since the input cut-off of the optical signal of the wavelength $\lambda_1$ is detected in the wavelength multiplexing station 2, an input cut-off alarm is issued for the wavelength $\lambda_1$, and an alarm indication signal (AIS) is notified to the downstream stations. At the same time, respective bits corresponding to the wavelength $\lambda_1$ in the optical supervisory channel generated by the OSC transmitter 25 are respectively set to WCS $(\lambda_1)$="1", WCF $(\lambda_1)$="1", WCC $(\lambda_1)$="0" and WCA $(\lambda_1)$="0".

The repeating and amplifying station 4 having received the alarm indication signal and the optical supervisory channel from the wavelength multiplexing station 2, determines that the input cut-off state of the wavelength $\lambda_1$ has occurred in the upstream station, since the information in the optical supervisory channel indicates WCS $(\lambda_1)$="1", and WCF $(\lambda_1)$="1", and hence masks the input cut-off alarm for the wavelength $\lambda_1$ issued by the repeating and amplifying station 4. The information recognized by the OSC receiver 42 in the repeating and amplifying station 4 is directly transferred to the OSC transmitter 43, and an optical supervisory channel the same as the optical supervisory channel transmitted from the wavelength multiplexing station 2, and the alarm indication signal are transmitted from the repeating and amplifying station 4 to the downstream side. Also in the optical add-drop station 5, as in the repeating and amplifying station 4, due to receiving the alarm indication signal, and the information of the optical supervisory channel becoming WCS $(\lambda_1)$="1" and WCF $(\lambda_1)$="1", the optical add-drop station 5 detects that the input cut-off state of the wavelength $\lambda_1$ has occurred in the upstream station, and masks the input cut-off alarm for the wavelength $\lambda_1$ issued in its own station. As a result, since the input cut-off state for the wavelength $\lambda_1$ is issued only from the wavelength multiplexing station 2 closest to the failure spot, the failure spot in the system can be easily determined in a short period of time.

In the case of (B) of FIG. 4, in the repeating and amplifying station 4, being the downstream station closest to the failure spot, though the WCF in the optical supervisory channel from the upstream side is not "1", input cut-off is detected in each wavelength. Therefore, the input cut-off alarm is issued for all wavelengths $\lambda_1$ to $\lambda_N$ included in the WDM light, and the alarm indication signal is notified to the downstream side, and the optical supervisory channel in which WCF ($\lambda_1$ to $\lambda_N$) is set to "1" is transmitted from the OSC transmitter 43 to the downstream side. The optical add-drop station 5 determines that the input cut-off for all wavelengths has occurred in the upstream station, based on the input cut-off alarm from the repeating and amplifying station 4 and the WCF in the optical supervisory channel, and masks the input cut-off alarm for all wavelengths issued in its own station.

Next the operation at the time of controlling the power of optical signals of the respective wavelengths included in the WDM light, in the case other than adding or dropping a wavelength, will be described.

As described above as the fourth problem in the conventional configuration, when the level of the optical signal power for the respective wavelengths fluctuates due to the fluctuation in the optical fiber loss, if the control for absorbing (compensating) the level fluctuation is performed at the same time in the plurality of stations in the system, a change in the optical signal power due to the control on the upstream side affects the control on the downstream side. As a result, it takes long time to perform the optical signal power control, and it may be difficult to perform normal control due to oscillation or the like.

Therefore, in the embodiment, monitoring of the input level of the optical signals of the respective wavelengths $\lambda_1$ to $\lambda_N$ transmitted from the upstream side is performed by using a monitor or the like (not shown) for the wavelength multiplexing station 2 and the optical add-drop station 5 in which the power of optical signals of the respective wavelengths is controlled, and when the monitored value changes exceeding a preset threshold with respect to the input level in the normal channel service condition, the attenuation is controlled so that the level fluctuation is absorbed (compensated) by the corresponding variable optical attenuator. At this time, in order to notify the downstream station of the fact that the control for absorbing (compensating) the level fluctuation is being executed in its own station, the bit corresponding to the wavelength to be absorbed of the WCA included in the optical supervisory channel to be transmitted from its own station to the optical transmission line 3 on the downstream side is set to "1".

Even in the downstream station, the level fluctuation is similarly monitored as in the upstream station, but it is determined that the control for absorbing (compensating) the level fluctuation for the wavelength having bits of WCS="1", WCF="0" and WCA="1" is being performed in the upstream station, based on the information in the optical supervisory channel transmitted from the upstream station, and hence the control for absorbing (compensating) the level fluctuation in its own station (downstream station) is not performed, and is set to the stand-by state. Moreover, when the control for absorbing (compensating) the level fluctuation in the upstream station is completed and the bit value of the WCA is changed to "0", the control for absorbing (compensating) the level fluctuation in its own station is started. Since the input level to the downstream station of the wavelength to be controlled for absorbing (compensating) the level fluctuation is already matched with the level at the time of the normal channel service in the upstream station, the input level is basically within the threshold of the level fluctuation. As a result, the control for absorbing (compensating) the level fluctuation in the downstream station can be shifted to a stable state immediately.

According to the WDM optical transmission system in the aforementioned first embodiment, the information included in the optical supervisory channel includes the WCC and the WCA in addition to the WCS and the WCF, and the optical supervisory channel is communicated between stations and used for the control in each station. As a result, the first to the fourth problems in the conventional configuration can be solved.

In the aforementioned first embodiment, an example is shown in which one repeating and amplifying station 4 and one optical add-drop station 5 are respectively arranged on the optical transmission line 3 between the wavelength multiplexing station 2 and the wavelength demultiplexing station 7. However, the present invention is not limited thereto, and a plurality of repeating and amplifying station 4 and a plurality of optical add-drop station 5 can be arranged on the optical transmission line 3.

Figure 5:
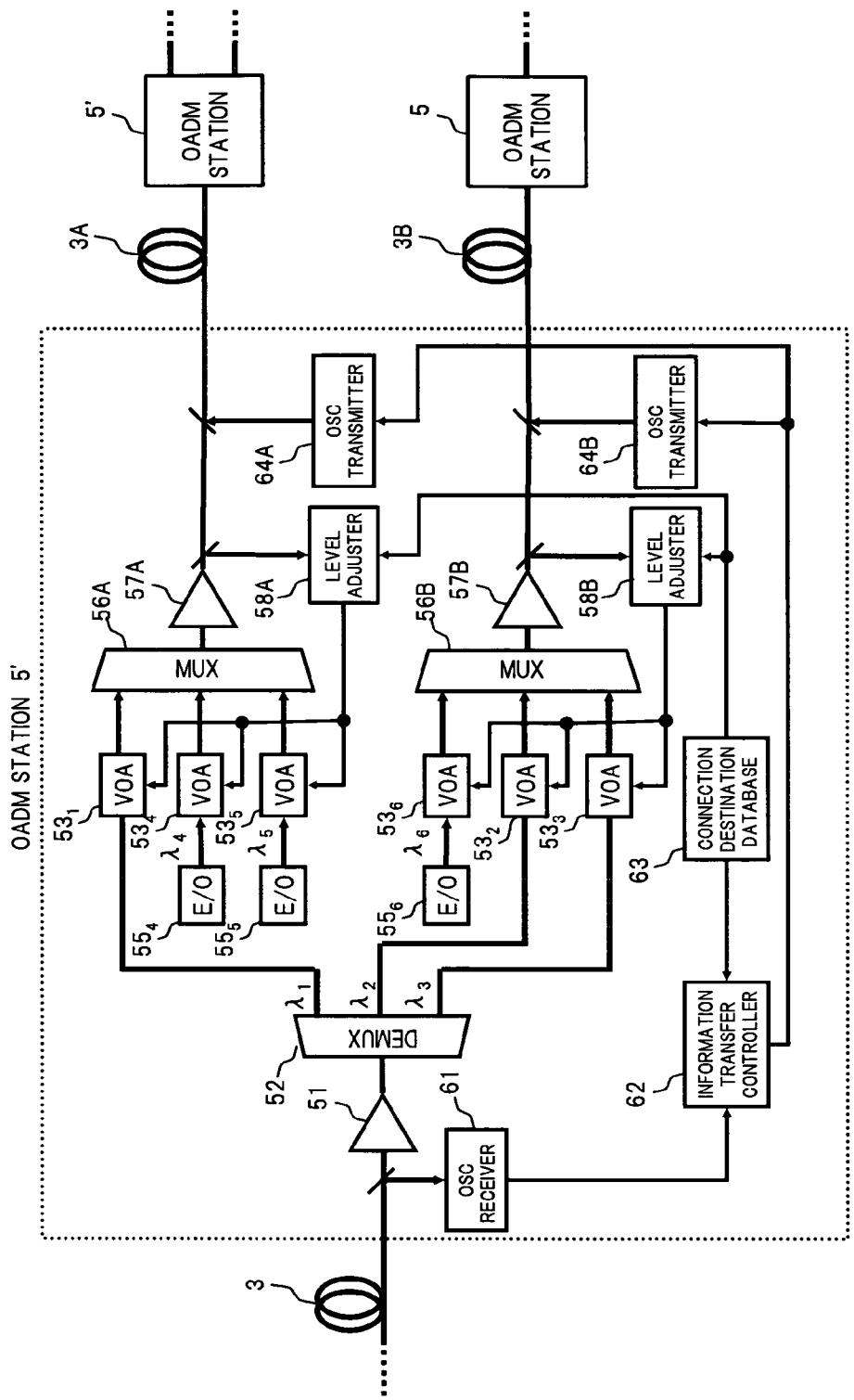
FIG. 5 is a diagram showing another configuration example of an optical add-drop station associated with the first embodiment.

Moreover, the case is shown for where the optical add-drop station 5, respective optical signals of the through wavelength directly optically connected without using the optical receiver $54_N$ and the optical transmitter $55_N$ are multiplexed in the same multiplexer 56, and transmitted to the optical transmission line 3 in the same direction. However, for example as in the optical add-drop station 5' shown in FIG. 5, a node configuration such that the optical signal of the wavelengths $\lambda_1$ demultiplexed in the demultiplexer 52 is optically connected to the multiplexer 56A, and the optical signals of the wavelengths $\lambda_1$ and $\lambda_3$ are optically connected to the multiplexer 56B is also possible.

Specifically, in the optical add-drop station 5', the optical signal of the wavelength $\lambda_1$ input from the demultiplexer 52 via the variable optical attenuator $53_1$ and the optical signals of wavelengths $\lambda_4$ and $\lambda_5$ input from the optical transmitters $55_4$ and $55_5$ via the variable optical attenuators $53_4$ and $53_5$ are multiplexed in one of the multiplexer 56A, and after the WDM light including the optical signals of the respective wavelengths $\lambda_1$, $\lambda_4$ and $\lambda_5$ is amplified by the optical amplifier 57A, the amplified WDM light is transmitted to the optical transmission line 3A together with the optical supervisory channel generated by the OSC transmitter 64A. Moreover, in the other multiplexer 56B, the optical signal of wavelengths $\lambda_2$ and $\lambda_3$ input from the demultiplexer 52 via the variable optical attenuators $53_2$ and $53_3$, and the optical signal of the wavelength $\lambda_6$ input from the optical transmitter $55_6$ via the variable optical attenuator $53_6$ are multiplexed, and the WDM light including the respective optical signals of wavelengths $\lambda_2$, $\lambda_3$ and $\lambda_6$ are amplified by the optical amplifier 57B, and then transmitted to the optical transmission line 3B together with the optical supervisory channel generated in the OSC transmitter 64B. In the connection destination database 63 in the optical add-drop station 5', connection destination data related to which side of the multiplexers 56A and 56B the respective optical signals of wavelengths $\lambda_1$ to $\lambda_3$ transmitted from the upstream side are to be optically connected is stored in advance, and various types of information in the optical supervisory channel from the upstream station received by the OSC receiver 61 are transferred to the corresponding level adjuster 58A or 58B according to the connection destination data, so that level adjustment of the optical signals of the respective wavelengths at the time of adding or dropping a wavelength, at the time of a failure, or at the time of absorbing the level fluctuation is performed in the same manner as in the aforementioned first embodiment, under the control of the respective level adjusters 58A and 58B.

Figure 6:
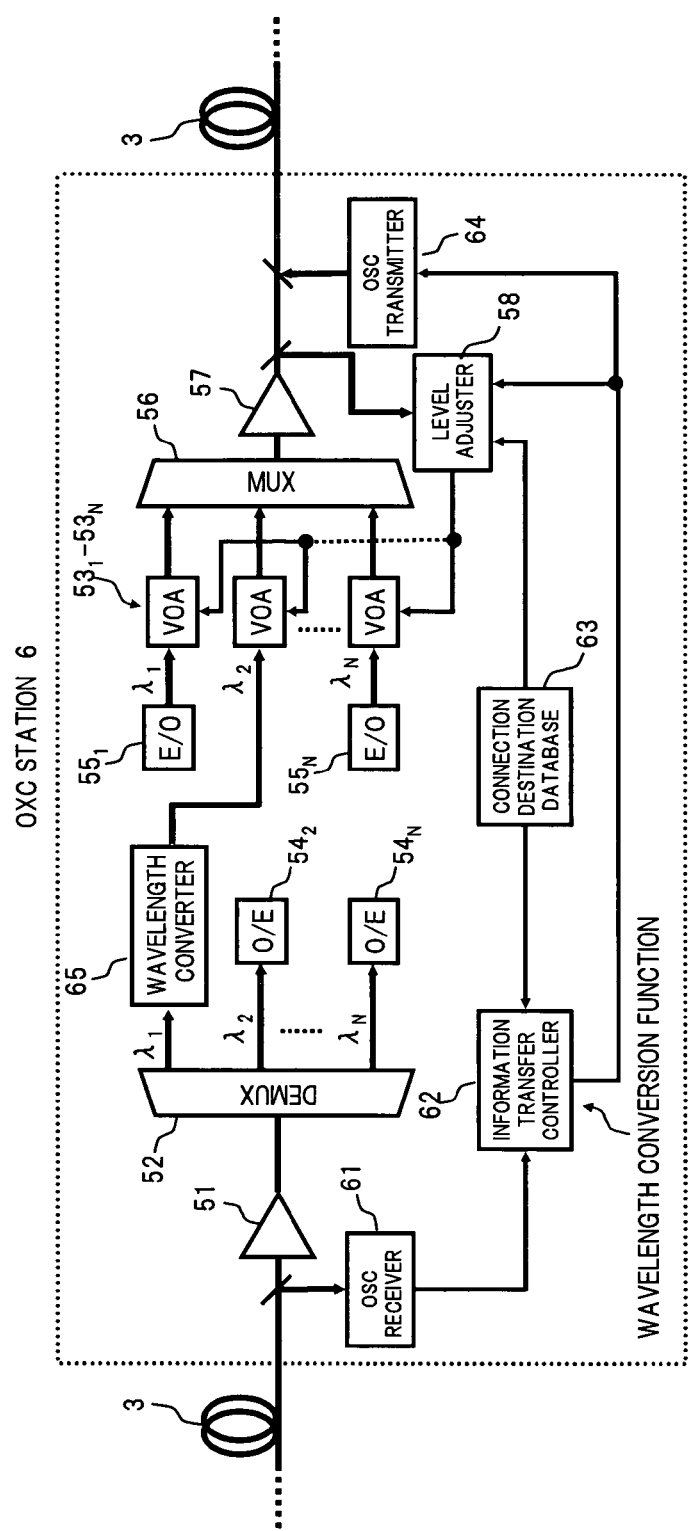
FIG. 6 is a diagram showing a configuration example of an optical cross-connect station associated with the first embodiment.

Moreover, with respect to the optical add-drop function in the first embodiment, easy correspondence to the optical cross-connect function including wavelength conversion becomes possible by adding a wavelength converting function. FIG. 6 is a diagram showing a configuration example of an optical cross-connect station, to which the present invention is applied. In the optical cross-connect station, for example, an optical signal of a wavelength $\lambda_1$ transmitted from the upstream station is converted to an optical signal of a wavelength $\lambda_2$ and transmitted to the downstream station. In this case, a different point in the configuration of the optical cross-connect station 6 from that of the aforementioned optical add-drop station 5 is that an output port of the demultiplexer 52 corresponding to the wavelength $\lambda_1$ and an input port of the variable optical attenuator $53_2$ corresponding to the wavelength $\lambda_2$ are connected via a wavelength converter 65, and an optical receiver $54_2$ is connected to the output port of the demultiplexer 52 corresponding to the wavelength $\lambda 2$, and an optical transmitter $55_1$ is connected to the input port of the optical attenuator $53_1$ corresponding to the wavelength $\lambda_1$. The wavelength converter 65 is a known wavelength converting device which converts the optical signal of the wavelength $\lambda_1$ demultiplexed by the demultiplexer 52 into an optical signal of the wavelength $\lambda_2$ directly in the optical state.

In such an optical cross-connect station 6, when various types of information included in the optical supervisory channel received by the OSC receiver 61 are transferred to the level adjuster 58 by the information transfer controller 62 according to the data stored in the connection destination database 63, the information corresponding to the signal of the wavelength $\lambda_1$ is converted to the information corresponding to the signal of the wavelength $\lambda_2$ and transferred. As a result, the level adjustment of the optical signals of the respective wavelengths is performed at the time of adding or dropping a wavelength, at the time of a failure, or at the time of absorbing the level fluctuation, in the same manner as in the case of the aforementioned optical add-drop station 5. As a result, a similar effect to the case of the first embodiment can also be obtained in the WDM optical transmission system having the optical cross-connect function.

Here, an example is shown in which when the information is transferred from the OSC receiver 61 to the level adjuster 58, the information transfer controller 62 performs conversion of wavelengths. However, the configuration may be such that the information transfer controller 62 does not perform conversion of wavelengths, but the level adjuster 58 performs the conversion of wavelengths at the time of using the received information.

Next a second embodiment of the present invention will be described below.

In the first embodiment, the description was for a case in which the control of the optical signal power for the respective wavelengths $\lambda_1$ to $\lambda_N$ included in the WDM light is performed by using the variable optical attenuator provided for each wavelength. However, other than the above described method of controlling the optical signal power for the respective wavelengths $\lambda_1$ to $\lambda_N$, there are known other methods of controlling a tilt of power with respect to the wavelengths of all optical signals included in the WDM light, for example, by using a gain tilt characteristic of a rare earth doped optical fiber amplifier, or by adjusting a plurality of wavelengths of pumping light or power ratio in a Raman amplifier. Therefore in the second embodiment, a WDM optical transmission system in which the level control for each wavelength by using the variable optical attenuator in the first embodiment, and the above described tilt control are combined to realize long distance transmission will be described.

Figure 7:
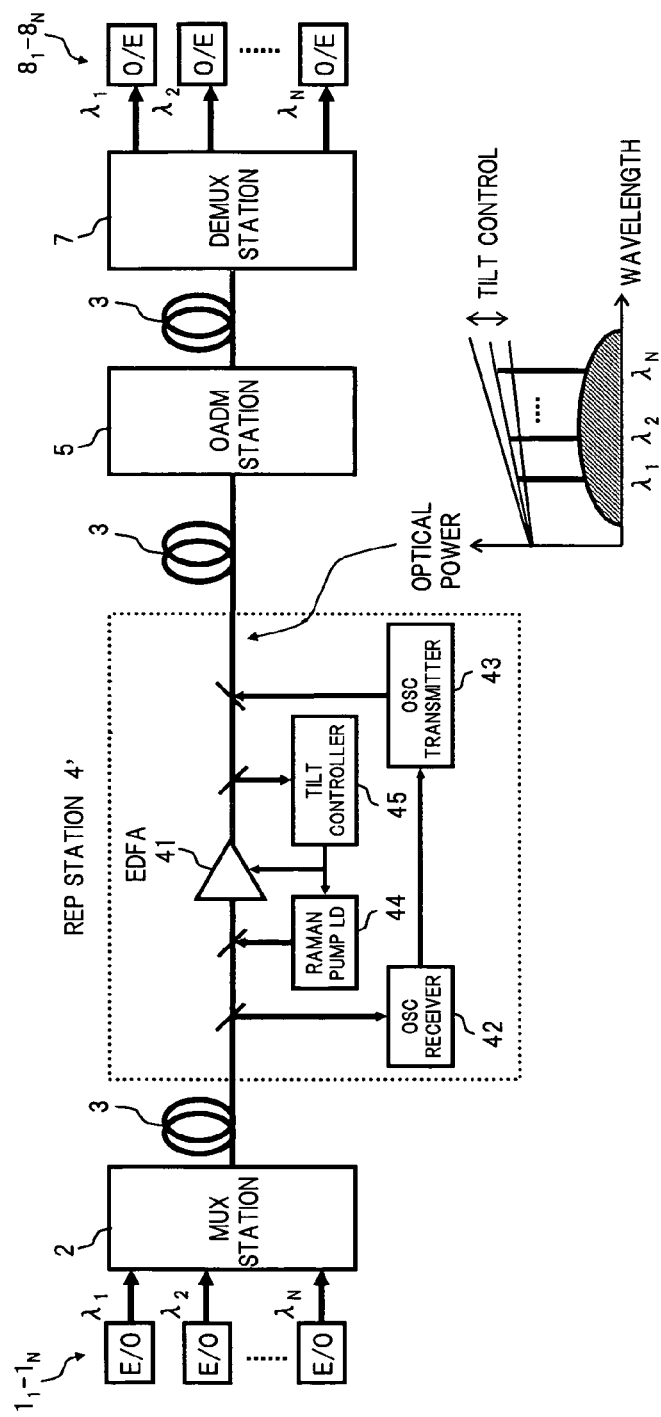
FIG. 7 is a diagram showing the configuration of a WDM optical transmission system according to a second embodiment of the invention.

FIG. 7 is a diagram showing the configuration of the WDM optical transmission system according to the second embodiment of the present invention.

In FIG. 7, in the WDM optical transmission system in the second embodiment, for example, a repeating and amplifying station 4' having a two-stage configuration in which a distribution type Raman amplifier (DRA) and an erbium doped optical fiber amplifier (EDFA) are serially connected is applied to the configuration of the first embodiment, and the pumping state of the DRA and the EDFA in the repeating and amplifying station 4' is controlled to perform tilt control of the WDM light, and the level control for each wavelength by using the variable optical attenuator in the wavelength multiplexing station 2 and the optical add-drop station 5 based on the information included in the optical supervisory channel is associated with the tilt control in the repeating and amplifying station 4'.

Specifically, the repeating and amplifying station 4' includes a known EDFA 41 capable of collectively amplifying the WDM light, a Raman pump laser (LD) 44 which supplies pumping light for Raman amplification to the optical transmission line 3 connected to the input side of the EDFA 41, a tilt controller 45 which controls the driving state of a pump laser (not shown) in the EDFA 41 and the Raman pump laser 44, while monitoring the spectrum of the WDM light output from the EDFA 41, an OSC receiver 42 and an OSC transmitter 43.

Here, the EDFA 41 is applied, but it is of course possible to apply an optical fiber amplifier doped with rare earth element other than erbium. Moreover, the means for performing tilt control is not limited to the aforementioned combination of the EDFA and the DRA, and for example, a known tilt control device such as an optical filter having variable transmission wavelength characteristic can be used.

In the WDM optical transmission system having the above described configuration, level control for each wavelength by the variable optical attenuator is generally performed in the wavelength multiplexing station 2, as in the case of the first embodiment, and after completion of the control, the repeating and amplifying station 4' performs tilt control of the whole WDM light. At this time, the power of optical signals of the respective wavelengths $\lambda_1$ to $\lambda_N$ input to the optical add-drop station 5 on the downstream side becomes unstable, until the tile control in the repeating and amplifying station 4' finishes, even if the feedback control for each wavelength in the wavelength multiplexing station 2 has converged. Therefore in this system the repeating and amplifying station 4' transmits information indicating the completion of the tilt control in its own station to the downstream side, carried on the optical supervisory channel, and the optical add-drop station 5 suspends the level control for each wavelength by the variable optical attenuator in its own station, until it recognizes the completion of the tilt control on the upstream side, based on the information carried on the optical supervisory channel from the repeating and amplifying station 4'.

FIG. 8 is a diagram showing a format example of the optical supervisory channel applied to the second embodiment. In this format example, one bit information (TILT) indicating whether the tilt control has finished is added as a fifth item, in the format of the optical supervisory channel applied to the aforementioned first embodiment shown in FIG. 2. Here, for example, TILT="0" indicates under tilt control, and TILT="1" indicates completion of tilt control.

Therefore, the OSC transmitter 43 in the repeating and amplifying station 4' generates the optical supervisory channel in which the bit value of the TILT is changed to "0" while the tilt control is being performed in its own station and transmits the signal to the downstream side, and when the tile control has been completed, generates the optical supervisory channel in which the bit value of the TILT is set to "1" and transmits the signal to the downstream side. As a result, in the optical add-drop station 5, while the optical supervisory channel from the upstream side indicates TILT="0", the level control for each wavelength is suspended and in the stand-by state, and when the optical supervisory channel indicates TILT="1", level control for each wavelength is started.

As a result, after the level control by the variable optical attenuator in the wavelength multiplexing station 2, and the tilt control in the repeating and amplifying station 4' have been completed, level control by the respective variable optical attenuators in the optical add-drop station 5 is performed. Therefore, stable control of the optical signal power for the respective wavelengths at the time of adding or dropping a wavelength, or the like can be performed.

In the second embodiment, an example is shown in which one repeating and amplifying station 4' is arranged on the optical transmission line 3 between the wavelength multiplexing station 2 and the optical add-drop station 5. However, the present invention is not limited thereto, and a plurality of repeating and amplifying stations 4' may be arranged on the optical transmission line 3. In this case, the tilt control in the respective repeating and amplifying stations 4' is performed in order of from the upstream side, and after the level control in the wavelength multiplexing station 2 and the tilt control in all the repeating and amplifying stations 4' have been completed, the level control in the optical add-drop station 5 is started.

Next a third embodiment of the present invention will be described below.

In the third embodiment, as an application example of the aforementioned first embodiment, a WDM optical transmission system also corresponding to a pre-emphasis control function will be described. Pre-emphasis control refers to control for rendering the power of optical signals of the respective wavelengths nonuniform in the wavelength multiplexing station on the transmission side, in order to equalize the optical signal to noise ratio (OSNR) in each wavelength after the WDM transmission.

Figure 9:
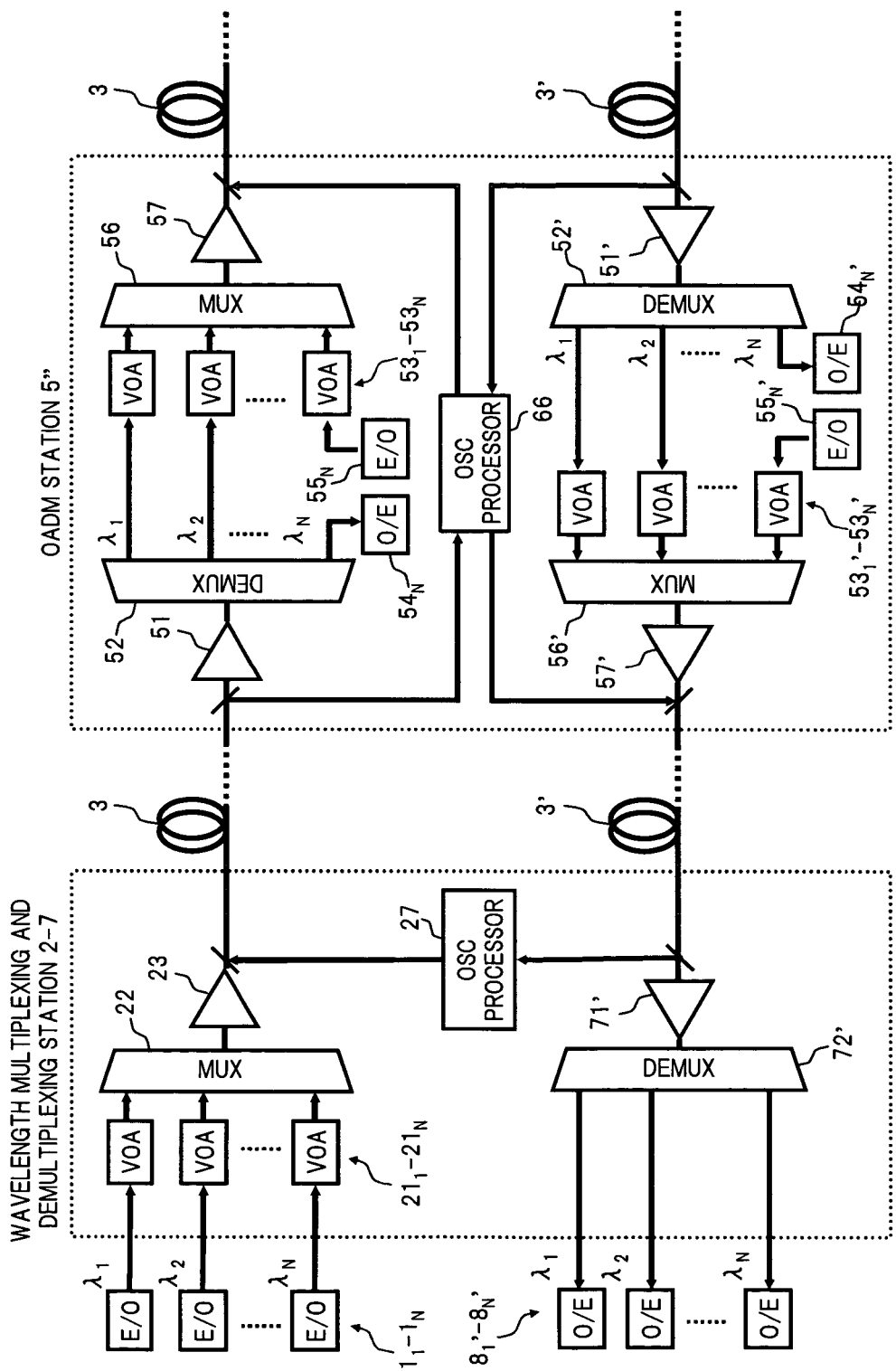
FIG. 9 is a diagram showing a configuration of a main part of a WDM optical transmission system according to a third embodiment of the invention.

FIG. 9 is a diagram showing the configuration of a main part of the WDM optical transmission system according to the third embodiment of the present invention.

The overall configuration of the WDM optical transmission system in this embodiment is a system configuration for performing two-way WDM optical transmission in which two configurations of the first embodiment are combined so as to correspond to up link and down link. A specific configuration example of a wavelength multiplexing and demultiplexing station 2-7 and an optical add-drop station 5", being the characteristic part thereof, is shown in FIG. 9. Here, the WDM light transmitted on the optical transmission line 3 to the right, shown on the upper side in the figure, is designated as an up-link signal light, and the WDM light transmitted on the optical transmission line 3' to the left, shown on the lower side in the figure, is designated as a down-link signal light. The respective constituents on the up-link side are denoted by like reference symbols in the corresponding configuration of the first embodiment, and the respective constituents on the down-link side are denoted by adding ['] to like reference symbols in the corresponding configuration of the first embodiment, so that the correspondence between these becomes clear.

The wavelength multiplexing and demultiplexing station 2-7 is formed as one wavelength multiplexing and demultiplexing station by combining the configuration of the wavelength multiplexing station 2 and the configuration of the wavelength demultiplexing station 7 in the first embodiment. An OSC processor 27 in the wavelength multiplexing and demultiplexing station 2-7 has the function of the OSC transmitter 25 in the wavelength multiplexing station 2, and the function of the OSC receiver 73 in the wavelength demultiplexing station 7. Here, for simplifying the figure, for the configuration on the multiplexing side, the illustration of the level adjuster for performing the feedback control of the respective variable optical attenuators $21_1$ to $21_N$ is omitted.

The optical add-drop station 5" is formed by combining the configuration of the optical add-drop station 5 in the first embodiment, so as to respectively correspond to the up link and the down link. An OSC processor 66 in the figure has functions of the OSC receiver 61 and the OSC transmitter 64 on the up-link side, and functions of the OSC receiver 61 and the OSC transmitter 64 on the down-link side. Here, for simplifying the figure, illustration of; the level adjuster for performing the feedback control of the respective variable optical attenuators $53_1$ to $53_N$ and $53_1'$ to $53_N'$, the information transfer controller, and the connection destination database is omitted.

In the WDM optical transmission system having such a configuration, in order to equalize the OSNR of the respective wavelengths $\lambda_1$ to $\lambda_N$ at the reception end (not shown) for the up-link WDM light, the variable optical attenuators $21_1$ to $21_N$ in the wavelength multiplexing and demultiplexing station 2-7, and the variable optical attenuators $53_1$ to $53_N$ in the optical add-drop station 5" are respectively controlled, and the pre-emphasis control is executed so that the power of optical signals of the respective wavelengths $\lambda_1$ to $\lambda_N$ becomes nonuniform. In this pre-emphasis control, when long distance transmission of the WDM light is performed, the nonuniformity in the OSNR between the respective wavelengths $\lambda_1$ to $\lambda_N$ occurring in the optical amplifiers existing on the optical transmission line 3 increases. Therefore the control amount is likely to increase. However, since the adjustment range of attenuation by the respective variable optical attenuators is limited, for example, even if the variable optical attenuator is fully opened (minimum attenuation), the control variable required for the pre-emphasis may not be ensured. To cope with such a situation, in this embodiment, for example, the optical supervisory channel in the format as shown in FIG. 10 is transmitted between the wavelength multiplexing and demultiplexing station 2-7 and the optical add-drop station 5" via the up link and the down link, to request the other stations for the control variable that cannot be ensured by its own station, thereby enabling realization of wide-range pre-emphasis control.

For example, when the variable optical attenuator $21_1$ corresponding to the wavelength $\lambda_1$ in the wavelength multiplexing and demultiplexing station 2-7 is outside the controllable range, and the pre-emphasis amount of X [dB] becomes insufficient, the insufficient amount of X [dB] is notified to the optical add-drop station 5" on the downstream side, by using the information corresponding to the forward direction pre-emphasis request $\lambda_1$ in the optical supervisory channel transmitted from the wavelength multiplexing and demultiplexing station 2-7 to the optical add-drop station 5" via the up link. The optical add-drop station 5" having received the notification performs control for changing the attenuation of the variable optical attenuator $53_1$ corresponding to the wavelength $\lambda_1$ by X [dB].

In contrast, when the variable optical attenuator $53_1$ corresponding to the wavelength $\lambda_1$ in the optical add-drop station 5" is outside the controllable range and the pre-emphasis amount of Y [dB] becomes insufficient, the insufficient amount of Y [dB] is notified to the wavelength multiplexing and demultiplexing station 2-7 on the upstream side, by using the information corresponding to the backward direction pre-emphasis request $\lambda_1$ in the optical supervisory channel transmitted from the optical add-drop station 5" to the wavelength multiplexing and demultiplexing station 2-7 via the down link. The wavelength multiplexing and demultiplexing station 2-7 having received the notification performs control for changing the attenuation of the variable optical attenuator $21_1$ corresponding to the wavelength $\lambda_1$ by Y [dB].

It is assumed herein that the respective bit values (D0 to D7) in the forward direction pre-emphasis requests $\lambda_1$ to $\lambda_N$ and the backward direction pre-emphasis requests $\lambda_1$ to $\lambda_N$ in the format example shown in FIG. 10 indicate requested amount expressed by a complement of 2 obtained by, for example, converting a tenfold value of 0.1 [dB] step to the hexadecimal notation. In other words, when the requested amount is +3.0 [dB], it is expressed as "0001 1110" (bin), and when the requested amount is −3.0 [dB], it is expressed as "1110 0010" (bin).

As described above, according to the WDM optical transmission system in the third embodiment, in the case where the pre-emphasis control is executed, when a pre-emphasis amount of a size exceeding the controllable range of the variable optical attenuator is required with respect to an optical signal of a certain wavelength, the insufficient pre-emphasis amount that cannot be ensured by the variable optical attenuator in one station is notified to another station on the optical path corresponding to the wavelength by using the optical supervisory channel communicated between stations via the up and down links, so as to cooperate for the level adjustment of the wavelength in a plurality of stations, thereby enabling realization of the wide range pre-emphasis control.

Figure 11:
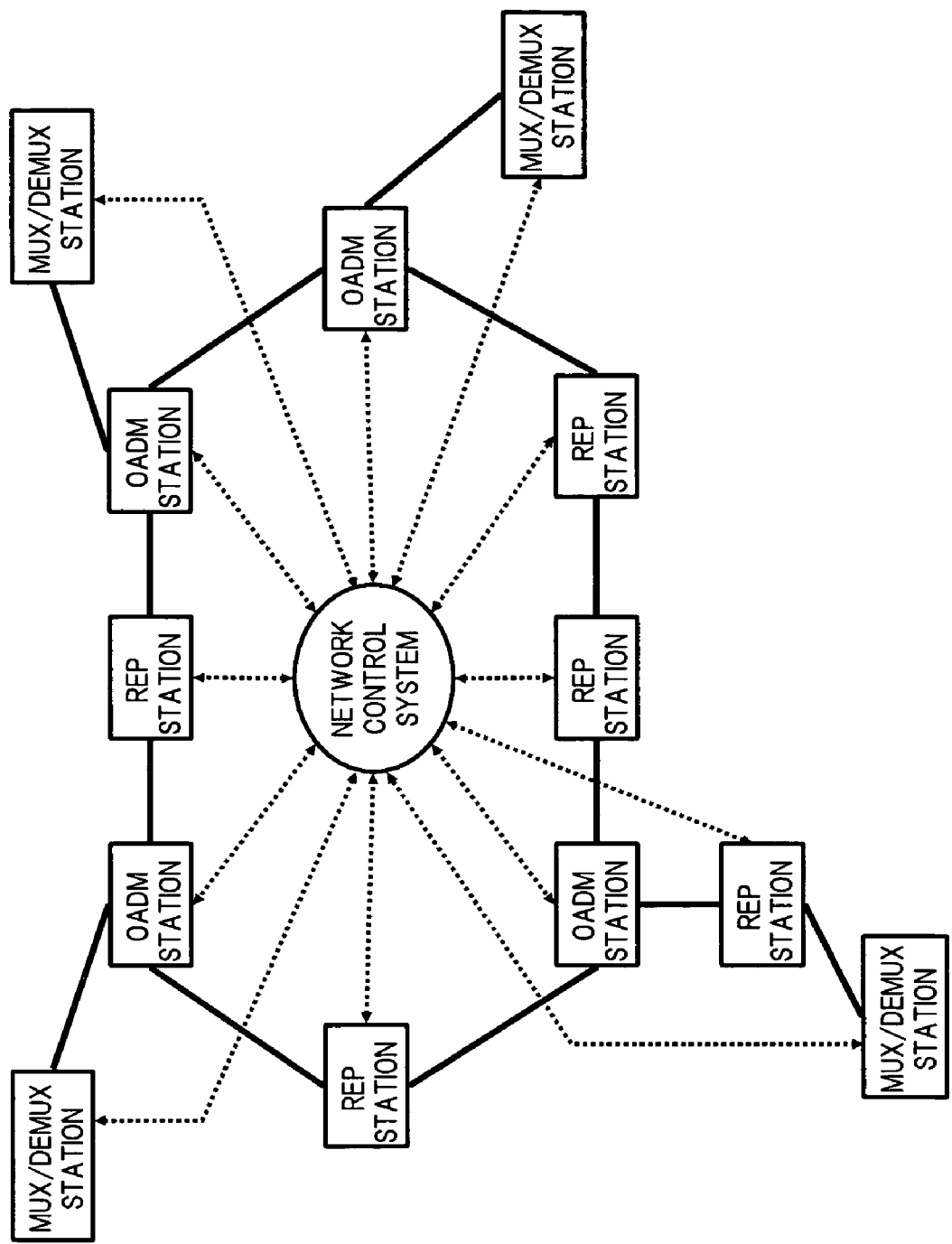
FIG. 11 is a diagram showing a configuration of a general network management system.
Figure 12:
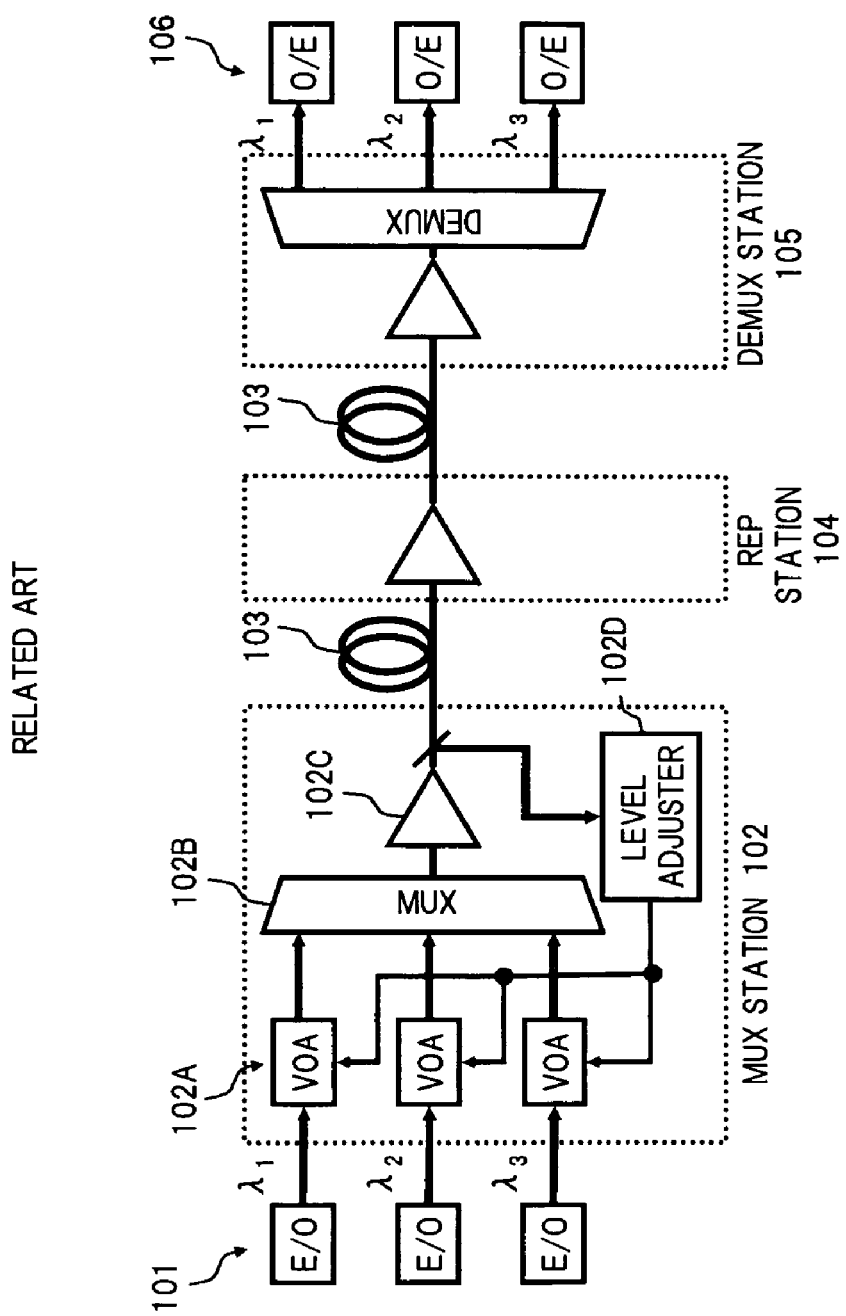
FIG. 12 is a diagram showing a basic configuration of a conventional WDM optical transmission system.
Figure 13:
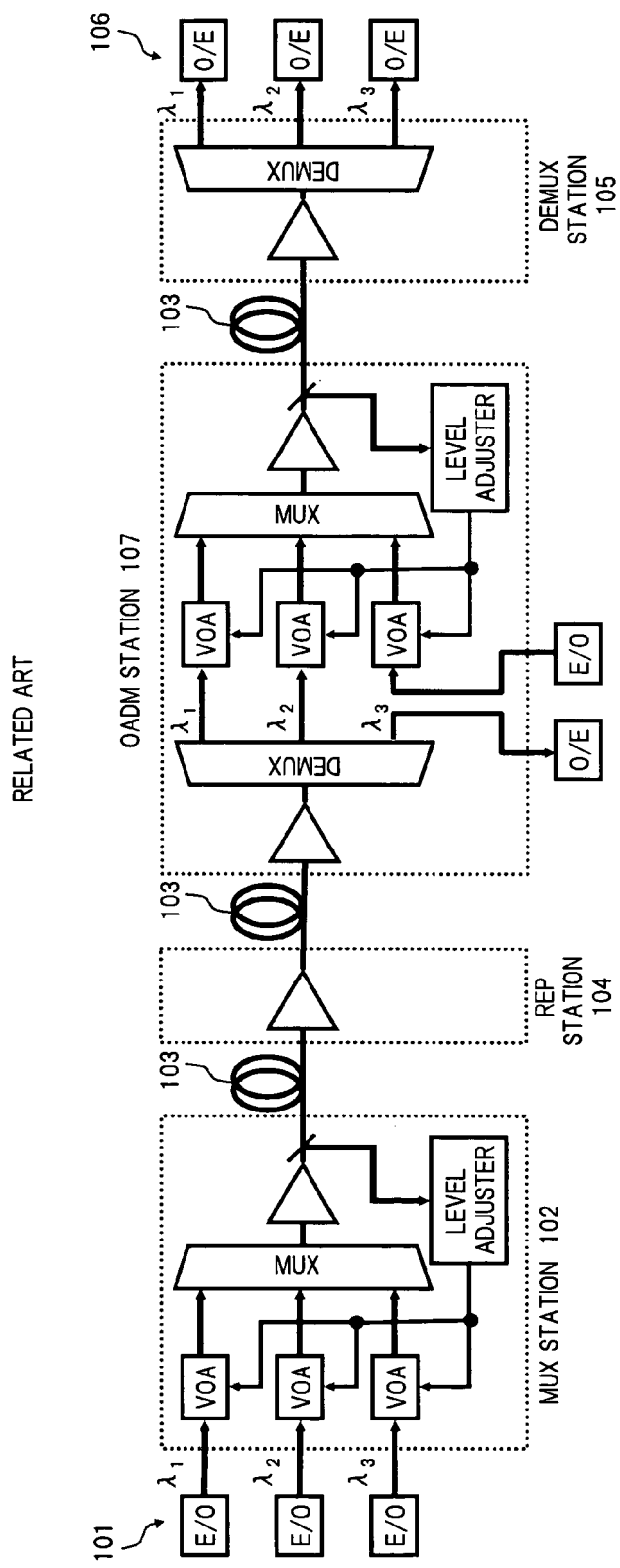
FIG. 13 is a diagram showing a configuration example of a WDM optical transmission system having a conventional optical add-drop function.
Figure 14:
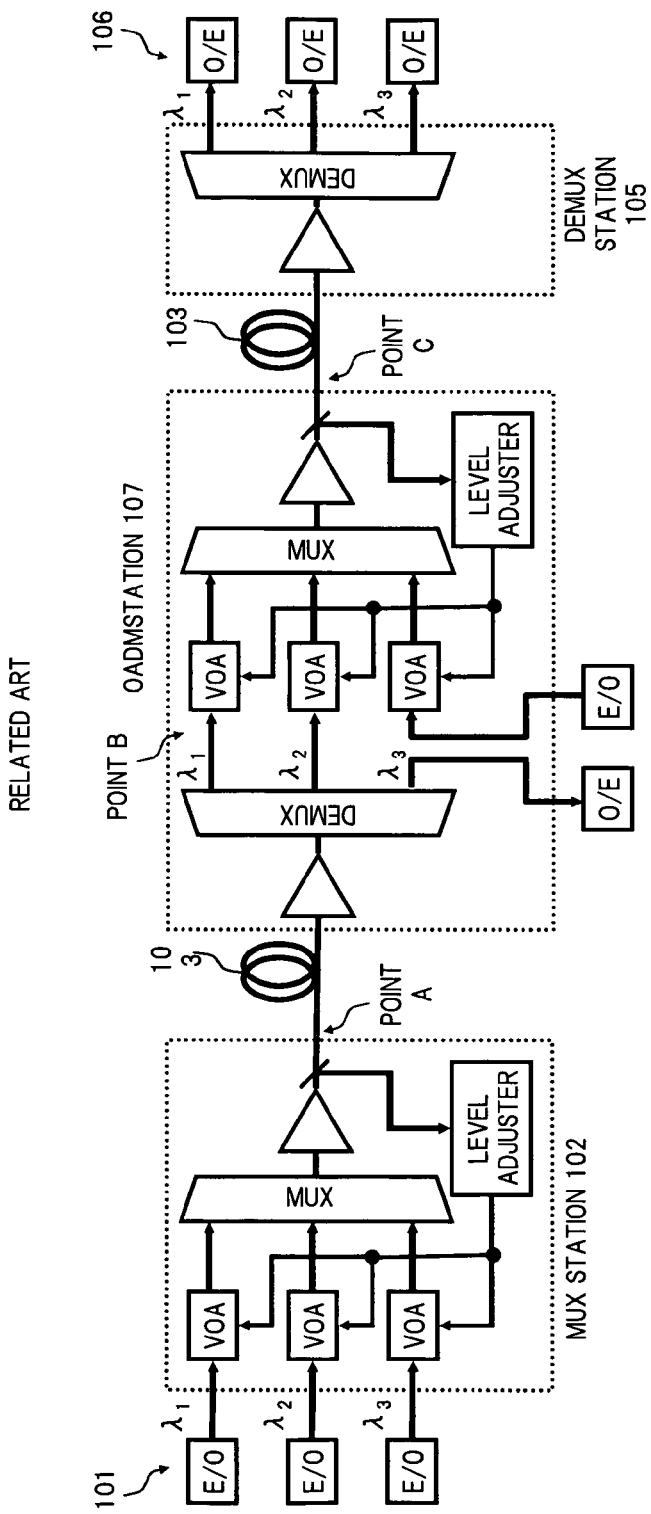
FIG. 14 is a diagram showing a configuration example assumed for explaining problems in the conventional WDM optical transmission system.
Figure 15:
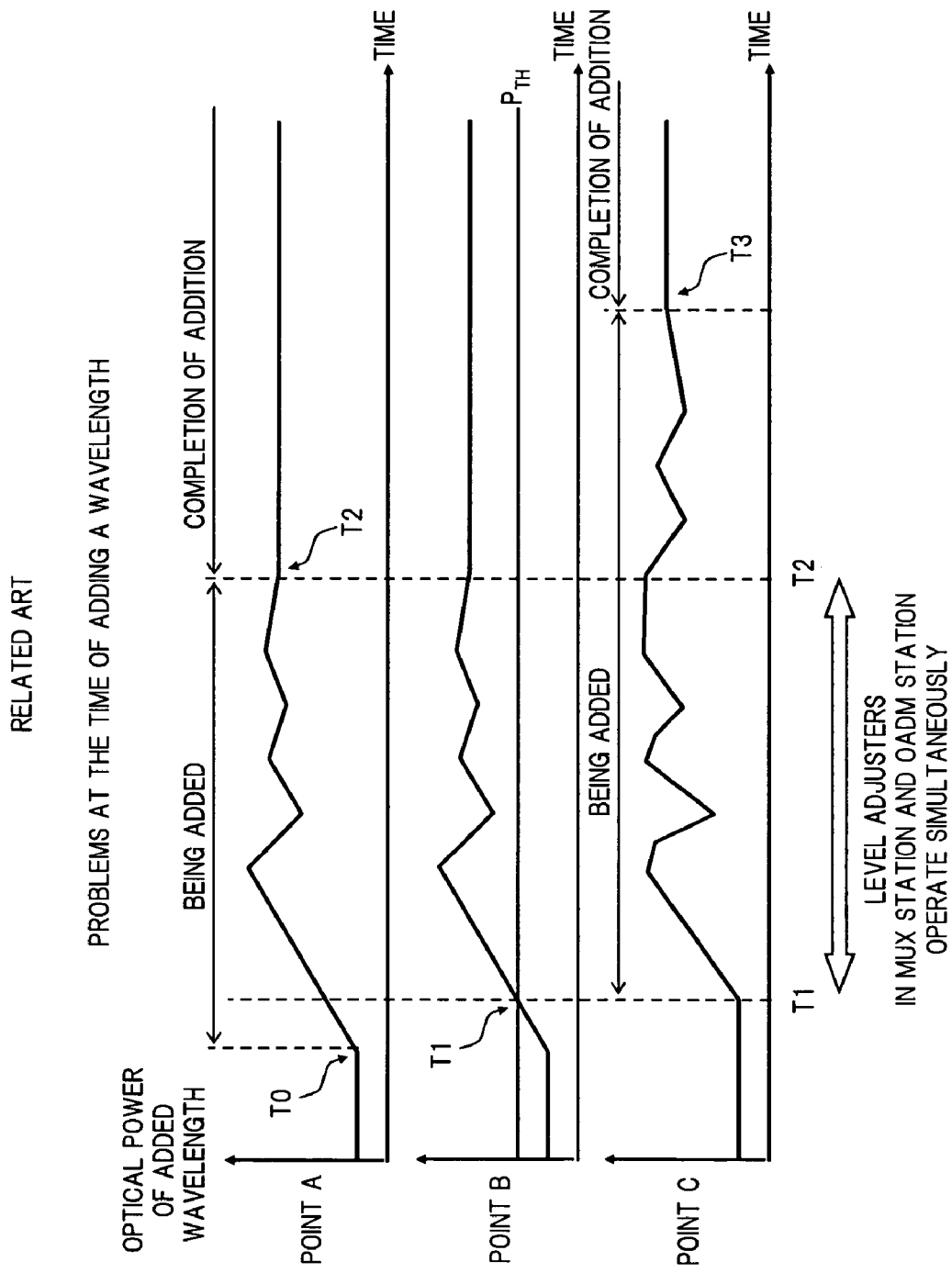
FIG. 15 is a diagram showing time variations in the optical power of a signal of the increased wavelength in the configuration of FIG. 14.

In the first to the third embodiments, the case in which the optical supervisory channel in a format obtained by extending an existing format is used as the means for transmitting the control information for other stations between stations where the control of the optical signal power for the respective wavelengths is performed has been described. However, the present invention is not limited to this example, and for example, a known network control system as shown in FIG. 11 may be used. This network control system is for controlling the whole network, and can centrally control all of the optical path information and the alarm information in the network. Specifically, the network control system collects and controls information relating to the setting and operation state of all stations in the network, and transmits setting information and the like to the respective stations to control the operation thereof. By using such a network control system, when control for adding or dropping a wavelength or the like is performed in the upstream station, the control state can be notified to the downstream station. As a result, similar operation effects to those of the respective embodiments can be obtained. However, when the network control system is used, the control state of the respective stations is remote-controlled. Therefore, from the viewpoint of real time control, it is advantageous to use the aforementioned optical supervisory channel communicated between the stations.

What is claimed is:

1. A wavelength division multiplexing optical transmission system in which a plurality of optical signals of different wavelengths is multiplexed in a wavelength multiplexing station to generate wavelength division multiplexed light, and the wavelength division multiplexed light is repeatedly transmitted via a plurality of stations arranged on an optical transmission line, and at least one of the plurality of stations on said optical transmission line is a path changing station which changes the path of the optical signals of the respective wavelengths included in said wavelength division multiplexed light, and said wavelength multiplexing station and said path changing station respectively control the power of the optical signals of the respective wavelengths included in said wavelength division multiplexed light, comprising an information communication unit which communicates a signal including information relating to the control state of the power of the optical signals of the respective wavelengths included in said wavelength division multiplexed light, between said wavelength multiplexing station and said path changing station, and said path changing station executes control of the power of the optical signals of the respective wavelengths in its own station, after having determined the completion of control of the power of the optical signals of the respective wavelengths in other stations located on the upstream side of its own station, based on information obtained by said information communication unit, wherein said path changing station has: an optical signal power controller which controls the power of optical signals of the respective wavelengths included in said wavelength division multiplexed light, based on information obtained by said information communication unit; a connection destination database in which information related to connection destination of the optical path of the optical signals of the respective wavelengths included in said wavelength division multiplexed light is stored in advance; and an information transfer controller which refers to said connection destination database, and of the information obtained by said information communication unit, transfers only information corresponding to the wavelength for which connection of said optical path is performed directly in the state of light, to said optical signal power controller.

2. A wavelength division multiplexing optical transmission system according to claim 1, wherein said information communication unit communicates a signal including wavelength channel service information indicating the wavelength of an optical signal under channel service included in said wavelength division multiplexed light, and wavelength channel change information indicating the wavelength of an optical signal for which control of the optical signal power is being executed, at a time of increasing or decreasing the number of wavelengths, and said path changing station determines the increased wavelength for which control of the optical signal power is being executed in another station located on the upstream side of its own station, based on said wavelength channel service information and said wavelength channel change information obtained by said information communication unit, puts the control of the optical signal power of said increased wavelength in its own station into a stand-by state, and then upon completion of the control in said other station, releases said stand-by state.

3. A wavelength division multiplexing optical transmission system according to claim 2, wherein
said path changing station determines a decreased wavelength based on said wavelength channel service information and said wavelength channel change information obtained by said information communication unit, to determine an input cut-off state of the optical signal of said decreased wavelength in its own station, regardless of noise light level.

4. A wavelength division multiplexing optical transmission system according to claim 2, wherein
said information communication unit communicates a signal including wavelength channel fail information indicating a wavelength of an optical signal having a failure, and
said path changing station determines the wavelength of an optical signal for which an input cut-off state occurs in another station located on the upstream side of its own station, based on said wavelength channel service information and said wavelength channel fail information obtained by said information communication unit, so as to perform masking processing of an input cut-off alarm issued in its own station for said wavelength.

5. A wavelength division multiplexing optical transmission system according to claim 2, wherein
said information communication unit communicates a signal including wavelength channel fail information indicating a wavelength of an optical signal having a failure, and wavelength channel absorbing information indicating a wavelength of an optical signal for which control for absorbing fluctuations in the optical signal power level is being executed, and
said path changing station determines the wavelength of the optical signal for which control for absorbing fluctuations in the optical signal power level is being executed in another station located on the upstream side of its own station, based on said wavelength channel service information, said wavelength channel fail information and said wavelength channel absorbing information obtained by said information communication unit, puts the control for absorbing the level fluctuations in said wavelength in its own station into a stand-by state, and then upon completion of the control for absorbing the level fluctuations in said other station, releases said stand-by state.

6. A wavelength division multiplexing optical transmission system according to claim 1, wherein said path changing station has an optical add-drop function.

7. A wavelength division multiplexing optical transmission system according to claim 1, wherein said path changing station has an optical cross-connect function.

8. A wavelength division multiplexing optical transmission system according to claim 1, having on said optical transmission line arranged upstream from said path changing station, a repeating and amplifying station comprising a tilt function which controls the tilt of power with respect to the wavelength of all the optical signals included in said wavelength divisonisn multiplexed light, and
said information communication unit communicates a signal including information relating to a control state of the power of the optical signals of respective wavelengths included in said wavelength division multiplexed light, and information indicating completion of tilt control in said repeating and amplifying station, between said wavelength multiplexing station, said repeating and amplifying station, and said path changing station, and
said path changing station executes control of the power of the optical signals of the respective wavelengths in its own station, after having determined the completion of both the control of the optical power of the respective wavelengths, and the tilt control, in other stations located on the upstream side of its own station, based on information obtained by said information communication unit.

9. A wavelength division multiplexing optical transmission system according to claim 8, wherein said repeating and amplifying station includes a rare earth doped optical fiber amplifier, and tilt control is performed by adjusting an pumping state of said rare earth doped optical fiber amplifier to change a gain tilt characteristic.

10. A wavelength division multiplexing optical transmission system according to claim 8, wherein said repeating and amplifying station includes a Raman amplifier, and tilt control is performed by adjusting an pumping state of said Raman amplifier to change a gain tilt characteristic.

11. A wavelength division multiplexing optical transmission system according to claim 1, wherein said wavelength multiplexing station and said path changing station each have a pre-emphasis function, and when a pre-emphasis control amount in an own station is insufficient, information indicating a control amount corresponding to the insufficient amount is communicated to another station by said information communication unit, so that a pre-emphasis control amount in another station is adjusted corresponding to the communicated information.

* * * * *